(12) United States Patent
Nakagawa et al.

(10) Patent No.: US 10,725,733 B2
(45) Date of Patent: Jul. 28, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Yusuke Nakagawa, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 132 days.

(21) Appl. No.: 15/777,403

(22) PCT Filed: Sep. 23, 2016

(86) PCT No.: PCT/JP2016/078107
§ 371 (c)(1),
(2) Date: May 18, 2018

(87) PCT Pub. No.: WO2017/104207
PCT Pub. Date: Jun. 22, 2017

(65) Prior Publication Data
US 2018/0336008 A1    Nov. 22, 2018

(30) Foreign Application Priority Data

Dec. 16, 2015 (JP) ................................. 2015-244868

(51) Int. Cl.
| | |
|---|---|
| G06F 3/048 | (2013.01) |
| G06F 3/16 | (2006.01) |
| G10L 15/22 | (2006.01) |
| G06F 3/038 | (2013.01) |
| G06F 3/0481 | (2013.01) |

(Continued)

(52) U.S. Cl.
CPC .............. *G06F 3/167* (2013.01); *G06F 3/017* (2013.01); *G06F 3/038* (2013.01); *G06F 3/0481* (2013.01); *G06F 3/0484* (2013.01); *G06F 3/04817* (2013.01); *G06K 9/00355* (2013.01); *G06K 9/00671* (2013.01); *G06K 9/00993* (2013.01); *G10L 15/22* (2013.01); *G06F 2203/0381* (2013.01)

(58) Field of Classification Search
CPC .. G06F 2203/0381; G06F 3/017; G06F 3/038; G06F 3/0481; G06F 3/04817; G06F 3/0484; G06F 3/167
See application file for complete search history.

(56) References Cited

U.S. PATENT DOCUMENTS

2005/0131686 A1* 6/2005 Yamamoto ............ G06F 3/0237
704/231
2011/0239118 A1* 9/2011 Yamaoka ................ G06F 3/017
715/709

(Continued)

*Primary Examiner* — Thanh T Vu
(74) *Attorney, Agent, or Firm* — Paratus Law Group, PLLC

(57) ABSTRACT

There is provided an information processing apparatus to further mitigate the effect of a delay associated with recognizing a gesture, the information processing apparatus including: an acquisition unit that acquires, on a basis of first input information corresponding to a detection result of a gesture, a prediction result of an operation corresponding to the gesture that is input subsequently; and a control unit that controls a process related to an acquisition of second input information associated with the first input information, in accordance with the prediction result of the operation.

18 Claims, 17 Drawing Sheets

(51) Int. Cl.
*G06K 9/00* (2006.01)
*G06F 3/01* (2006.01)
*G06F 3/0484* (2013.01)

(56) References Cited

U.S. PATENT DOCUMENTS

| | | | | |
|---|---|---|---|---|
| 2011/0276632 | A1* | 11/2011 | Anderson | G06Q 30/02 |
| | | | | 709/205 |
| 2011/0320949 | A1* | 12/2011 | Ohki | G06F 40/177 |
| | | | | 715/727 |
| 2013/0311916 | A1* | 11/2013 | Weng | G01C 21/005 |
| | | | | 715/764 |
| 2014/0184550 | A1* | 7/2014 | Hennessey | G06F 3/013 |
| | | | | 345/173 |
| 2015/0243277 | A1* | 8/2015 | Kashimoto | G10L 15/22 |
| | | | | 704/243 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2016/078107 (filed on Sep. 23, 2016) under 35 U.S.C. § 371, which claims priority to Japanese Patent Application No. 2015-244868 (filed on Dec. 16, 2015), which are all hereby incorporated by reference in their entirety.

TECHNICAL FIELD

The present disclosure relates to an information processing apparatus, an information processing method, and a program.

BACKGROUND ART

To control the operations of what is called an information processing apparatus, such as a personal computer (PC) or a game console, a variety of methods have been proposed as a user interface for acquiring input from a user. In particular, recently, with the development of technologies such as sound analysis and image analysis, various technologies have been proposed to recognize speech uttered by the user or an action by the user, and utilize the recognition result of the speech or action for control of the information processing apparatus. For example, Patent Literature 1 discloses an example of a technology for recognizing user actions (also called gestures).

Also, it is also possible to plurally combine various interfaces as described above. As a specific example, by using a gesture detection result to control the starting and stopping of speech recognition based on the user's utterance, it becomes possible to realize more intuitive operation compared to operation via an input device such as a mouse or a controller.

CITATION LIST

Patent Literature

Patent Literature 1: JP 2012-8772A

DISCLOSURE OF INVENTION

Technical Problem

On the other hand, recognizing an operation based on a detection result of a gesture may take more time in some cases than operation via an input device such as a mouse or a controller. For this reason, for example, under circumstances in which a gesture detection result is used to acquire other input information, such as speech or the like, the processing time for recognizing the operation expressed by the gesture in some cases may cause a delay to be produced in the timing at which the acquisition of the input information is started.

Accordingly, the present disclosure proposes an information processing apparatus, an information processing method, and a program capable of further mitigating the effect of a delay associated with recognizing a gesture.

Solution to Problem

According to the present disclosure, there is provided an information processing apparatus including: an acquisition unit that acquires, on a basis of first input information corresponding to a detection result of a gesture, a prediction result of an operation corresponding to the gesture that is input subsequently; and a control unit that controls a process related to an acquisition of second input information associated with the first input information, in accordance with the prediction result of the operation.

In addition, according to the present disclosure, there is provided an information processing method including, by a processor: acquiring, on a basis of first input information corresponding to a detection result of a gesture, a prediction result of an operation corresponding to the gesture that is input subsequently; and controlling a process related to an acquisition of second input information associated with the first input information, in accordance with the prediction result of the operation.

In addition, according to the present disclosure, there is provided a program causing a computer to execute: acquiring, on a basis of first input information corresponding to a detection result of a gesture, a prediction result of an operation corresponding to the gesture that is input subsequently; and controlling a process related to an acquisition of second input information associated with the first input information, in accordance with the prediction result of the operation.

Advantageous Effects of Invention

According to the present disclosure as described above, there are provided an information processing apparatus, an information processing method, and a program capable of further mitigating the effect of a delay associated with recognizing a gesture.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
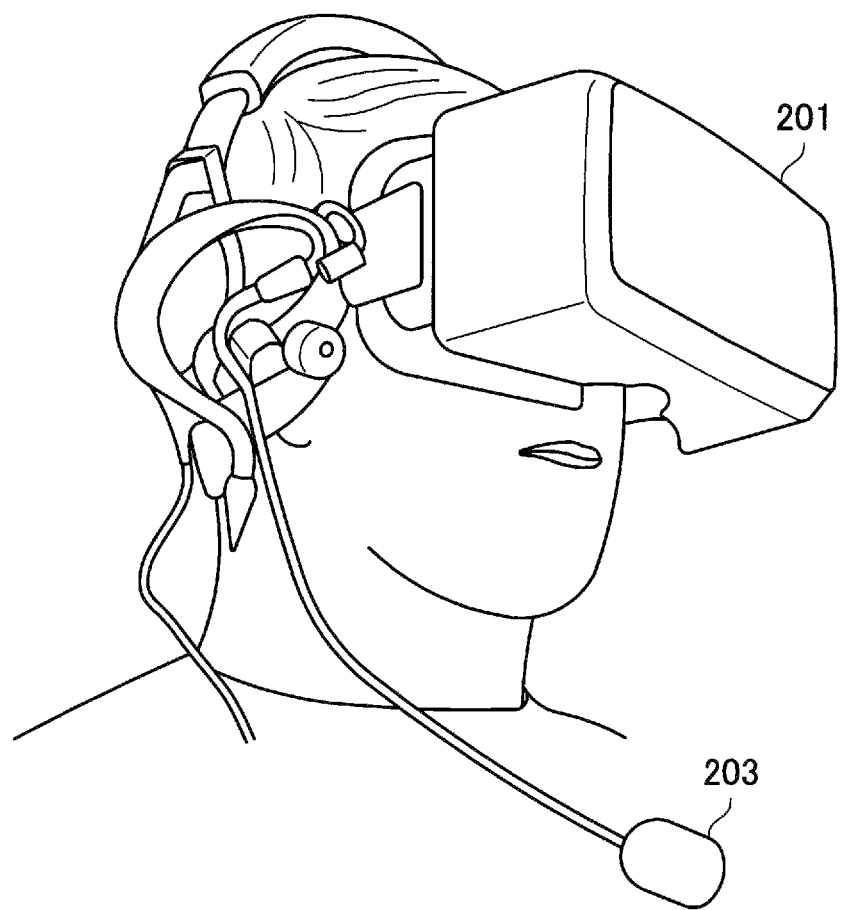
FIG. 1 is an explanatory diagram for explaining an example of a schematic configuration of an input/output apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will proceed in the following order.

1. Overview
1.1. Configuration of input/output apparatus
1.2. System configuration
1.3. User interface
1.4. Technical problem
2. Technical features
2.1. Operating principle
2.2. Functional configuration
2.3. Process
2.4. Working example
2.5. Modification 1: Example of combination with machine teaming
2.6. Modification 2: Optimization of operations related to prediction
3. Exemplary hardware configuration
4. Conclusion <<1. Overview>>

First, after summarizing an embodiment of the present disclosure, the technical problem of the present embodiment will be described.

<1.1. Configuration of Input/Output Apparatus>

First, an example of a schematic configuration of an input/output apparatus according to the present embodiment will be described with reference to FIG. 1. FIG. 1 is an explanatory diagram for explaining an example of a schematic configuration of the input/output apparatus according to the present embodiment.

As illustrated in FIG. 1, the input/output apparatus 20 according to the present embodiment includes a display unit 201 and a sound collection unit 203. In addition, the input/output apparatus 20 according to the present embodiment is configured as what is called a head-mounted display (HMD). In other words, the input/output apparatus 20 is configured so that, by being worn on a user's head, the display unit 201 (for example, a display panel) for displaying images is held in front of the user's eyes.

Note that the type of head-mounted display (HMD) applicable as the input/output apparatus 20 includes what is called an immersive HMD, a see-through HMD, a video see-through HMD, and a retinal projection HMD.

In the case in which an immersive HMD is worn on the user's head or face, the immersive HMD is worn to cover the user's eyes, and a display unit such as a display is held in front of the user's eyes. For this reason, for the user wearing the immersive HMD, it is difficult for the outside scene (that is, the scene of the real world) to enter into one's field of view directly, and only the picture displayed on the display unit enters one's field of view. With such a configuration, the immersive HMD is capable of imparting a sense of immersion to the user viewing an image.

A see-through HMD, for example, uses a half mirror and a transparent light guide plate to hold a virtual image optical system including a transparent light guide unit and the like in front of the user's eyes, and display an image on the inner side of the virtual image optical system. For this reason, for the user wearing the see-through HMD, it is possible for the outside scene to enter into one's field of view, even while viewing the image displayed on the inner side of the virtual image optical system. Note that specific examples of the see-through HMD include what is called a glasses-style wearable device, in which the part corresponding to the lenses of a pair of glasses are configured as the virtual image optical system.

A video see-through HMD is worn to cover the user's eyes, similarly to an immersive HMD, and a display unit such as a display is held in front of the user's eyes. On the other hand, the video see-through HMD includes an imaging unit for imaging the surrounding scene, and causes the display unit to display an image of the scene in the user's gaze direction imaged by the imaging unit. With such a configuration, for the user wearing the video see-through HMD, it is difficult for the outside scene to enter into one's field of view directly, but it becomes possible to check the outside scene by an image displayed on the display unit.

With a retinal projection HMD, a projection unit is held in front of the user's eyes, and an image is projected from the projection unit towards the user's eyes so that the image is superimposed onto the outside scene. More specifically, in a retinal projection HMD, an image is projected directly from the projection unit onto the retina of the user's eyes, and the image is formed on the retina. With such a configuration, the viewing of a clearer picture becomes possible, even in the case of a near-sighted or a far-sighted user. Also, for the user wearing the retinal projection HMD, it becomes possible for the outside scene to enter into one's field of view, even while viewing the image projected from the projection unit.

In addition, the input/output apparatus 20 according to the present embodiment may also be provided with an acceleration sensor and an angular velocity sensor (gyro sensor), for example, and be configured to be able to detect the motion of the head (the attitude of the head) of the user wearing the input/output apparatus 20. As a specific example, the input/output apparatus 20 detects the component in each of the yaw direction, pitch direction, and roll direction as the motion of the user's head. Additionally, on the basis of the detected motion of the user's head, the input/output apparatus 20 recognizes a change in the direction indicated by the user's gaze (hereinafter designated the "gaze direction" in some cases), and presents to the user an image corresponding to the recognized change in the gaze direction. On the basis of such a configuration, for example, by presenting to the user a picture inside a virtual space in accordance with a change in the user's gaze direction, it becomes possible to impart to the user a sense of immersion as though the user actually exists inside the virtual space.

In addition, the input/output apparatus 20 according to the present embodiment is configured to be able to collect speech uttered by the user with the sound collection unit 203. With such a configuration, for example, it becomes possible to recognize content expressed by the speech uttered by the user (that is, content indicated by the user) on the basis of speech recognition technology, and utilize the recognition result for various types of controls.

Additionally, the input/output apparatus 20 according to the present embodiment may also be configured to be able to acquire information for recognizing an action by a part such as a hand of the user.

As a specific example, the input/output apparatus 20 may also operate in conjunction with an imaging unit for acquiring image information, such as a still image or a moving image. In this case, the input/output apparatus 20 may also acquire an image of a part of the user imaged by the imaging unit as the information for recognizing an action by the part. Note that the configuration of the imaging unit is not particularly limited insofar as the imaging unit is capable of capturing an imaging of a target part. As a specific example, an imaging unit may be provided on a front face of the input/output apparatus 20 to image the front side. With such a configuration, for example, the input/output apparatus 20 becomes able to acquire an image of the user's hand positioned in front of the user wearing the input/output apparatus 20 imaged by the imaging unit as the information for recognizing an action by the hand. Also, as another example, the imaging unit may also be provided as a separate body from the input/output apparatus 20. With such a configuration, for example, the input/output apparatus 20 also becomes able to acquire a captured image of the user from an imaging unit installed in a certain direction with respect to the user (for example, approximately in front) as the information for recognizing an action by the user (or an action by a part of the user).

Figure 2:
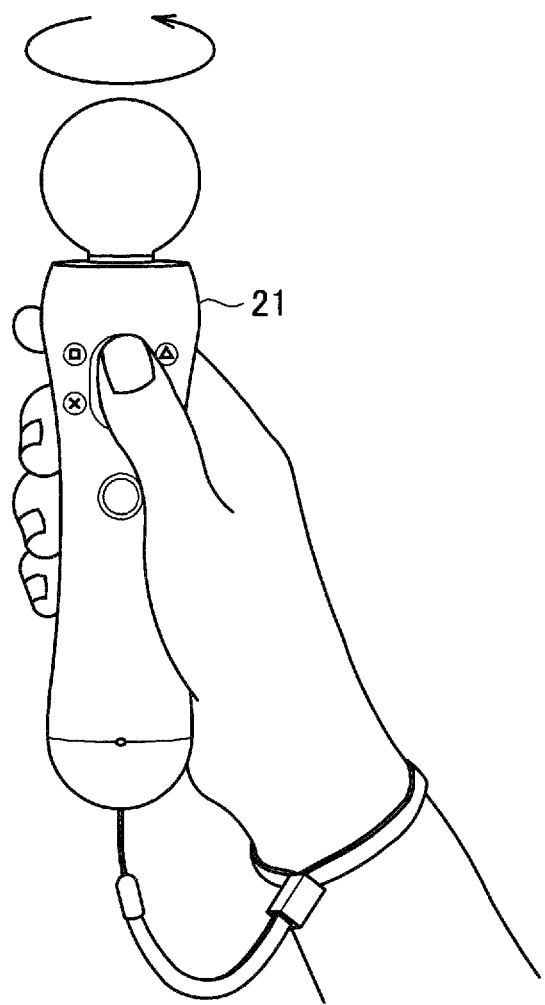
FIG. 2 is an explanatory diagram for explaining an example of an input apparatus for detecting an action by a user's hand.

Also, as another example, the input/output apparatus 20 may also operate in conjunction with an input apparatus that includes a detection unit such as a sensor for detecting an action by a part such as the user's hand. For example, FIG. 2 is an explanatory diagram for explaining an example of an input apparatus for detecting an action by the user's hand. As illustrated in FIG. 2, by having a housing gripped by the users hand, the input apparatus 21 is held by the user. Additionally, the input apparatus 21 is provided with a detection unit for detecting changes in the position and facing of the housing, such as an acceleration sensor and a gyro sensor (angular velocity sensor). With such a configuration, the input apparatus 21 becomes able to acquire a detection result of changes in the position and facing of the housing as information indicating changes in the position and facing of the hand gripping the housing (that is, information for recognizing the motion of the hand). Additionally, by capturing an image of the input apparatus 21 with an imaging unit provided externally, it also becomes possible to utilize the image as information for recognizing an action by the input apparatus 21 (and by extension, an action by the hand gripping the input apparatus 21).

With a configuration like the above, on the basis of information acquired by the input/output apparatus 20, it becomes possible to recognize a motion (also called a gesture) by a part of the user, thereby making it possible to utilize a recognition result of the motion of the part of the user for various types of controls.

The above describes an example of the schematic configuration of the input/output apparatus according to the present embodiment with reference to FIGS. 1 and 2. Note that the configuration of the input/output apparatus 20 described above is merely one example, and insofar as an operation by the user is detectable, the configuration of the input/output apparatus 20 is not necessarily limited to the example described with reference to FIG. 1.

<1.2. System Configuration>

Figure 3:
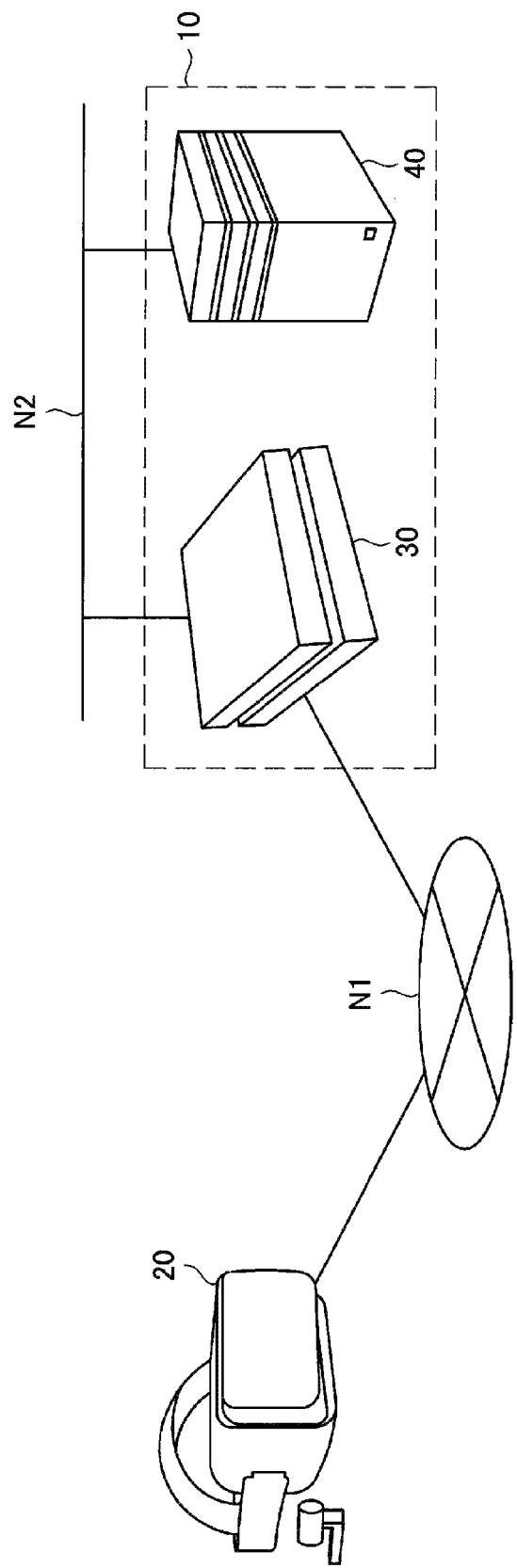
FIG. 3 is an explanatory diagram for explaining an example of a system configuration of an information processing system according to the embodiment.

Next, FIG. 3 will be referenced to describe an example of a system configuration of the information processing system 1 according to the present embodiment. FIG. 3 is an explanatory diagram for explaining an example of the system configuration of the information processing system 1 according to the present embodiment.

As illustrated in FIG. 3, the information processing system 1 according to the present embodiment includes the input/output apparatus 20, a content control apparatus 30, and a sound processing apparatus 40. In the example illustrated in FIG. 3, the input/output apparatus 20 and the content control apparatus 30 are communicably connected to each other through a network N1. Similarly, the content control apparatus 30 and the sound processing apparatus 40 are communicably connected to each other through a network N2. The networks N1 and N2 may include the Internet, a dedicated line, a local area network (LAN), a wide area network (WAN), or the like, for example. Note that insofar as the network connects different apparatus to each other, the mode of each of the networks N1 and N2 is not particularly limited.

The content control apparatus 30 is a configuration for providing content to the input/output apparatus 20. For example, the content control apparatus 30 plays back content on the basis of an instruction from the user through the input/output apparatus 20, and outputs output information, such as a picture and sound corresponding to the playback result, to the input/output apparatus 20. In addition, the content control apparatus 30 may also acquire information expressing input from the user through the input/output apparatus 20 (such as information expressing the gaze direction, a speech collection result, or a gesture detection result, for example), and on the basis of the acquired information, control the output of output information such as a picture and sound with respect to the input/output apparatus 20.

Note that the content control apparatus 30 may also execute various processes in accordance with the type or subject of the content. For example, on the basis of what is called virtual reality (VR) technology, the content control apparatus 30 may also present an artificially constructed virtual space (in other words, a picture and sound of a virtual space) to the user through the input/output apparatus 20. Also, as another example, on the basis of what is called augmented reality (AR) technology, the content control apparatus 30 may also present a virtually generated object (that is, a virtual object) to the user through the input/output apparatus 20 so that the virtual object is superimposed onto an object in real space.

In addition, the content control apparatus 30 may receive input from the user through the input/output apparatus 20, play back content on the basis of the input, and present the playback result of the content to the user through the input/output apparatus 20. As a specific example, the content control apparatus 30 may recognize a change in the gaze direction of the user on the basis of information acquired from the input/output apparatus 20, and generate a picture inside the virtual space indicated by the gaze direction on the basis of VR technology. With this arrangement, the content control apparatus 30 becomes able to present, to the user through the input/output apparatus 20, a generated picture inside the virtual space as a picture corresponding to a change in the gaze direction of the user. Also, as another example, the content control apparatus 30 may recognize a motion (that is, a gesture) of the user's hand on the basis of information acquired from the input/output apparatus 20, and execute a process corresponding to the gesture on the basis of the recognition result.

The sound processing apparatus 40 is a configuration for performing various types of sound analysis on input sound information. For example, the sound processing apparatus 40 may acquire a sound collection result of speech uttered by the user, and by performing analysis processing based on speech recognition technology and natural language processing technology on the collection result, recognize the speech content uttered by the user. Note that recognition result of speech content uttered by the user (that is, the result of a speech recognition process) may also be used by the content control apparatus 30 described above to execute various processes such as the playback of content, for example.

The above references FIG. 3 to describe an example of a system configuration of the information processing system 1 according to the present embodiment. Note that the system configuration of the information processing system 1 described above is merely one example, and is not necessarily limited to the example illustrated in FIG. 3. As a specific example, the input/output apparatus 20, the content control apparatus 30, and the sound processing apparatus 40 may also be configured in an integrated manner. In addition, the content control apparatus 30 and the sound processing apparatus 40 may also be configured in an integrated manner as an information processing apparatus 10.

<1.3. User Interface>

Figure 4:
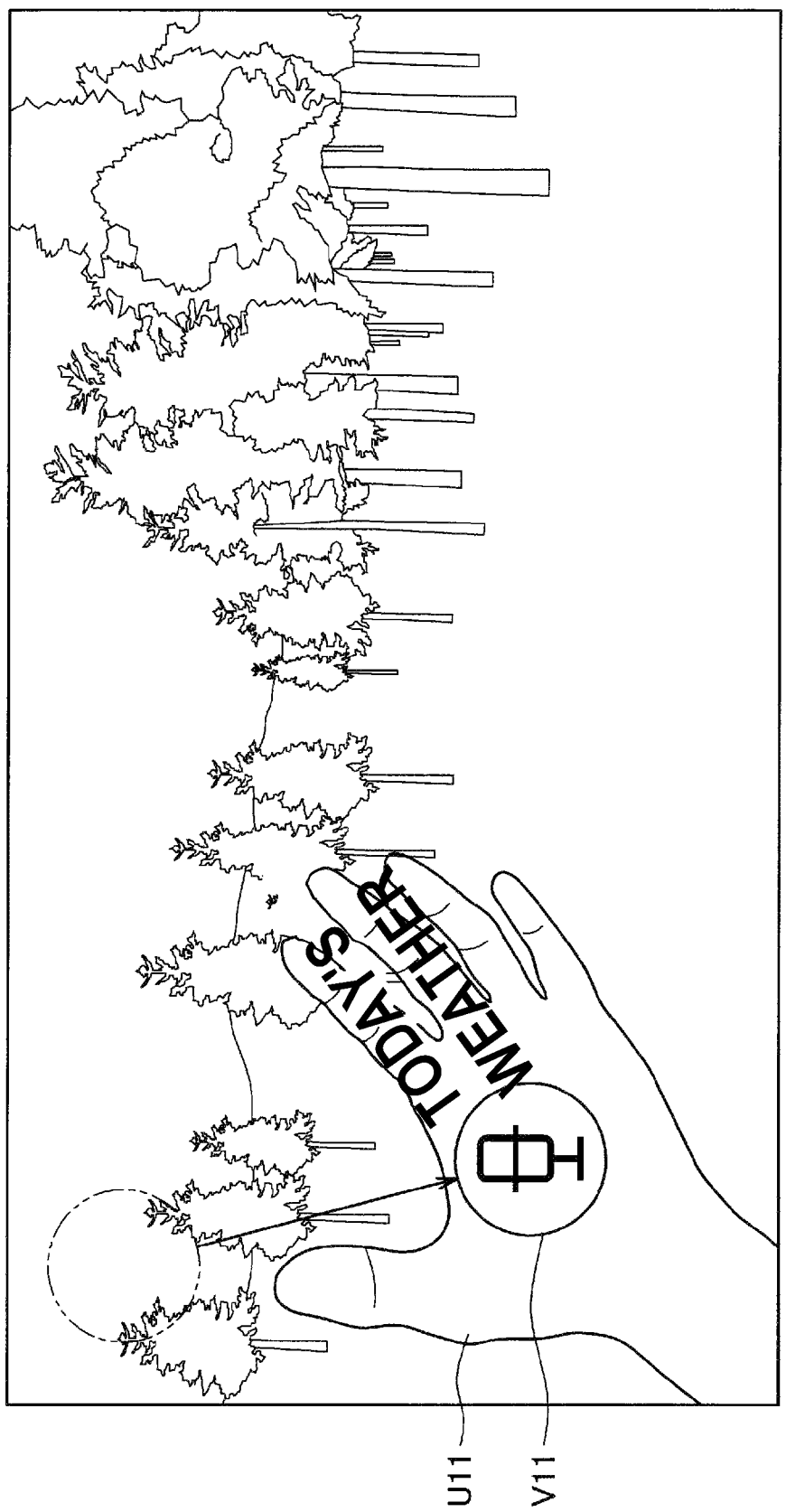
FIG. 4 is an explanatory diagram for explaining an example of a user interface provided by the information processing system according to the embodiment.
Figure 5:
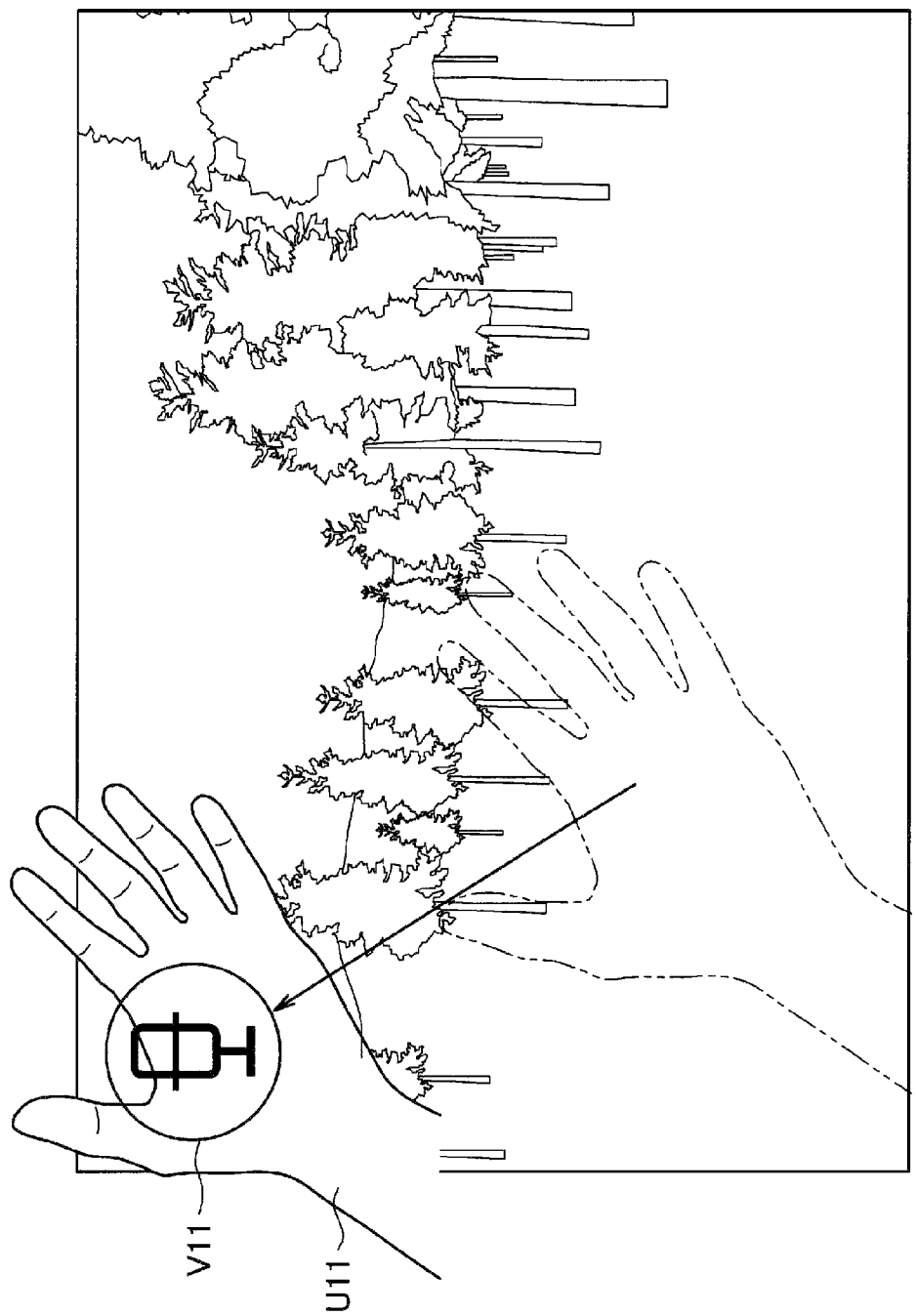
FIG. 5 is an explanatory diagram for explaining an example of a user interface provided by the information processing system according to the embodiment.

Next, FIGS. 4 and 5 will be referenced to describe an example of a user interface provided by the information processing system 1 according to the present embodiment. FIGS. 4 and 5 are explanatory diagrams for explaining an example of the user interface provided by the information processing system 1 according to the present embodiment, and illustrate an example of a user interface that anticipates a situation of presenting a virtual space to the user through the input/output apparatus 20.

In the example illustrated in FIGS. 4 and 5, the user inputs various information into the information processing system 1 (that is, performs various operations) by what is called gesture input using at least one part (for example, a hand) of one's own body, and by what is called speech input through speaking.

More specifically, in the example illustrated in FIGS. 4 and 5, the information processing system 1 presents an object (for example, an icon) V11 for initiating speech recognition in a part of an image presented to the user. Also, if a gesture using a hand by the user is detected, in accordance with the content of the detected gesture, a virtual hand (that is, a hand object) U11 formed in the virtual space is presented. With such a configuration, by operating the virtual hand U11 in the virtual space by gesture input using one's own hand, the user becomes able to perform operations on various objects (for example, the object V11) inside the virtual space via the hand U11. Note that the virtual hand U11 corresponds to an example of a "first display object". Also, the object V11 corresponds to an example of a "second display object".

Additionally, in the case of recognizing that an operation has been performed on the object V11 by the hand U11 inside the virtual space on the basis of a detection result of a gesture input from the user, the information processing system 1 initiates a process (that is, speech recognition) associated with the object V11. For example, in the example illustrated in FIG. 4, in the case of recognizing that the object V11 has been grasped by the hand U11 on the basis of a detection result of a gesture input from the user, the information processing system 1 initiates speech recognition associated with the object V11. Also, in the example illustrated in FIG. 5, in the case of recognizing that the hand U11 has overlapped the object V11 (in other words, the position of the hand U11 approximately matches the position of the object V11) on the basis of a detection result of a gesture input from the user, the information processing system 1 initiates speech recognition associated with the object V11.

In this way, by providing a user interface utilizing the user's embodiment on the basis of various recognition processes, the user becomes able to launch various processes such as speech recognition by intuitive and fast actions.

<1.4. Technical Problem>

Figure 6:
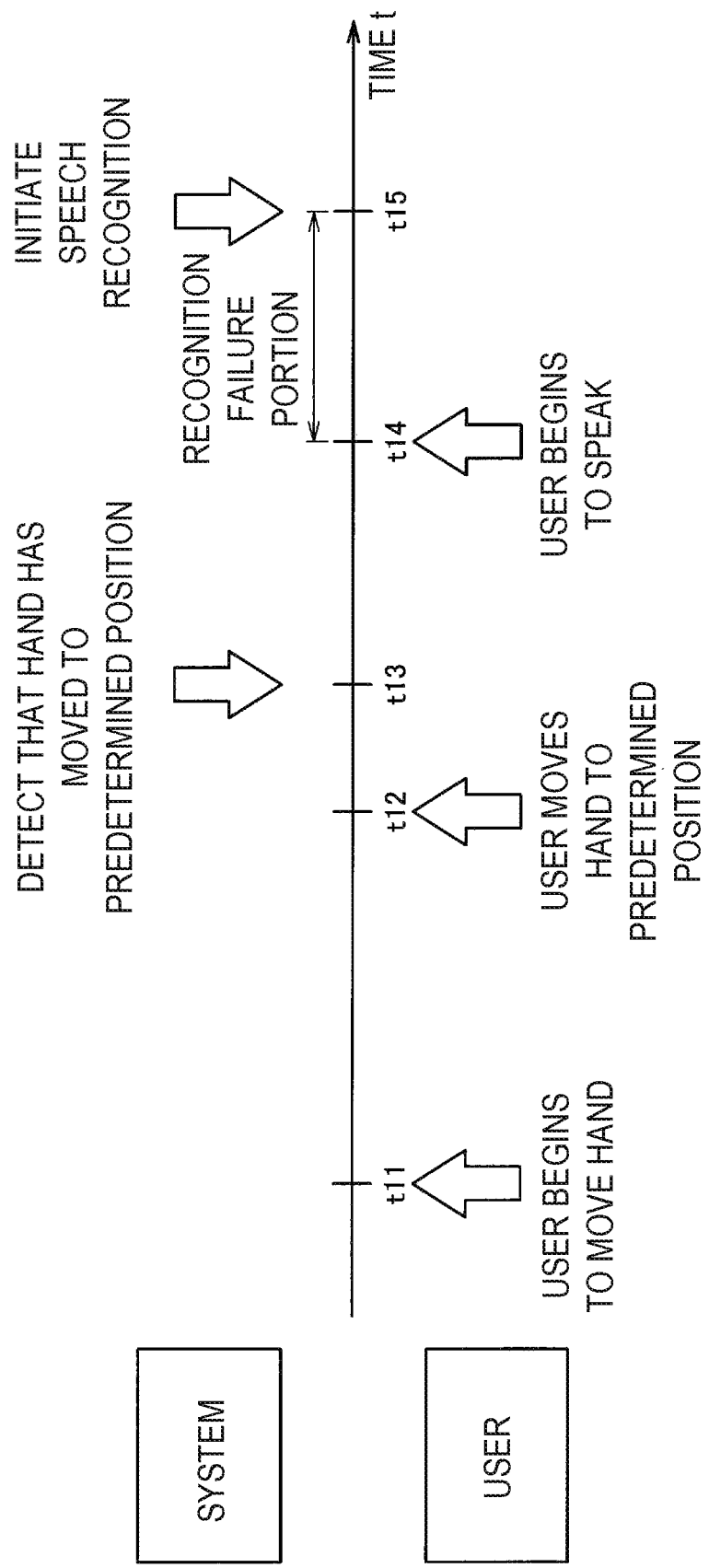
FIG. 6 is an explanatory diagram for explaining a technical problem of the information processing system according to the embodiment.

Next, FIG. 6 will be referenced to describe the technical problem of the information processing system 1 according to the present embodiment. FIG. 6 is an explanatory diagram for explaining the technical problem of the information processing system 1 according to the present embodiment. Note that in this explanation, the technical problem of the information processing system 1 according to the present embodiment will be described by focusing on a case in which, as described earlier with reference to FIG. 5, the user performs gesture input using one's hand to move the hand U11 to a certain position (for example, the position where the object V11 is presented) inside the virtual space, and thereby initiate speech recognition.

In FIG. 6, the horizontal axis represents the time t. Also, taking the time axis as a base of reference, the content of operations by the user and the timings of the operations are illustrated below along the time axis, while the content of processes by the system receiving the user operations and the timings of the process are illustrated above along the time axis.

For example, in the example illustrated in FIG. 6, at the timing t11, the user starts to move the hand U11 inside the virtual space by gesture input, and at the timing t12, the hand U11 reaches a certain position (for example, the position of the object V11). After that, at the timing t13, the system detects that the hand U11 has moved to the certain position, on the basis of an analysis result of the gesture input from the user. Additionally, on the basis of the detection result that the hand U11 has moved to the certain position, the system recognizes that the user has given an instruction to initiate the speech recognition process, and on the basis of the recognition result, initiates speech recognition at the timing t15.

In this way, until the system recognizes a user operation based on gesture input and initiates the speech recognition process on the basis of the recognition result of the operation, in some cases a systemic delay (for example, a delay due to processing and the like related to the recognition of the gesture) is actually produced. In particular, recognizing an operation based on a detection result of a gesture may take more time in some cases than operation via, an input device such as a mouse or a controller. For this reason, in some cases, a gap occurs between the timing of recognizing that speech recognition has become possible due to the user performing gesture input, and the timing at which the system actually initiates speech recognition.

For example, in the example illustrated in FIG. 6, at the timing t14 between the recognition of the user operation based on gesture input and the initiation of speech recognition by the system, the user begins to speak for the speech recognition. In such a case, the system fails to acquire the speech during the period from the timing t14 to the timing t15, or in other words the part at the beginning of the utterance, and in some cases may fail at speech recognition as a result.

Accordingly, the present disclosure proposes a mechanism that further mitigates the effect of a delay associated with recognizing a gesture, even under circumstances in which a gesture detection result is used to acquire other input information, such as speech or the like, thereby enabling the acquisition of the other input information in a more favorable mode.

<2. Technical Features>

Hereinafter, the technical features of the information processing system 1 according to the present embodiment will be described.

<2.1. Operating Principle>

Figure 7:
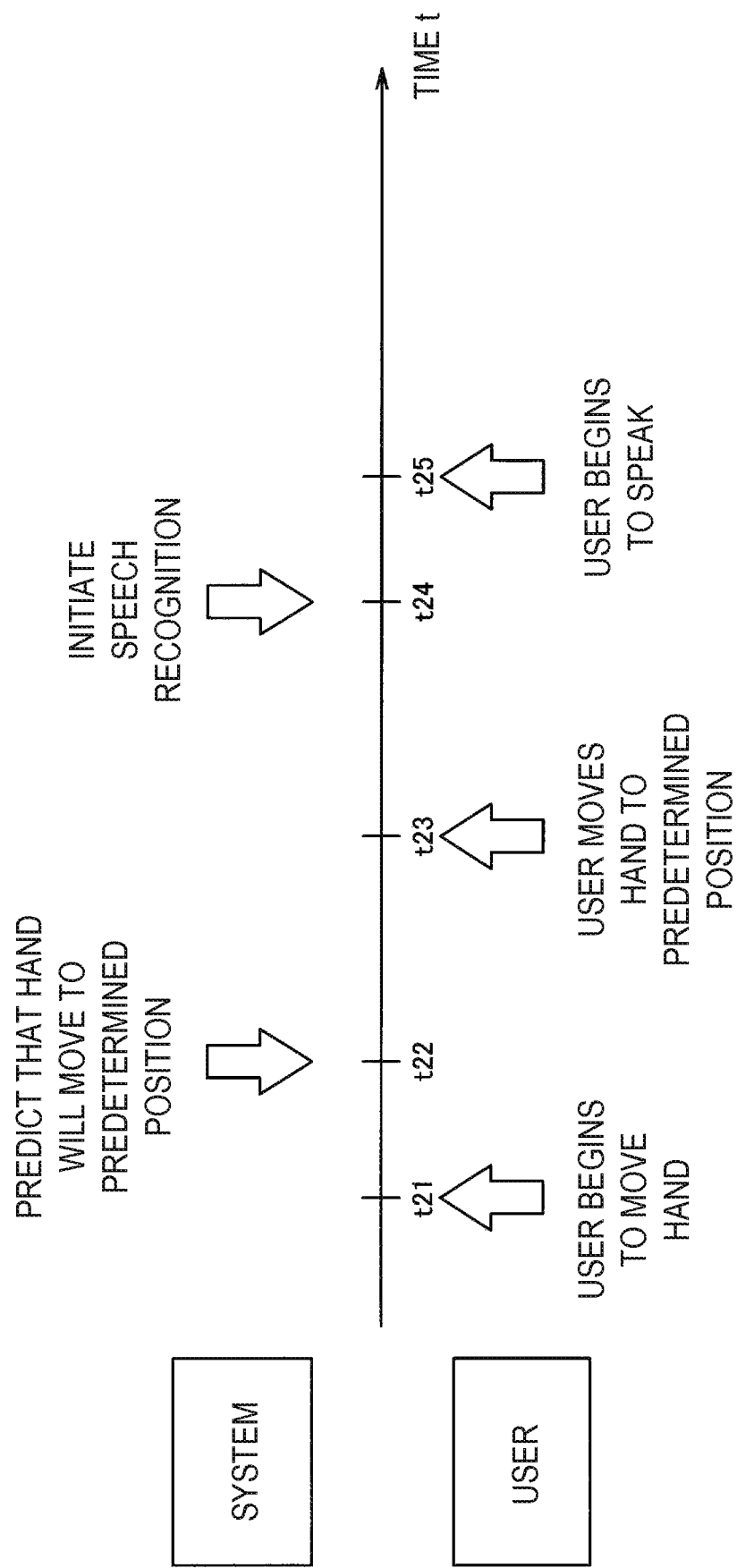
FIG. 7 is an explanatory diagram for explaining an operating principle of the information processing system according to the embodiment.

First, FIG. 7 will be referenced to describe the operating principle of the information processing system 1 according to the present embodiment. FIG. 7 is an explanatory diagram for explaining the operating principle of the information processing system 1 according to the present embodiment. Note that in this explanation, similarly to the example illustrated in FIG. 6, the operating principle of the information processing system 1 according to the present embodiment will be described by focusing on a case in which the user performs gesture input using one's hand to move the hand U11 to a certain position (for example, the position where the object V11 is presented) inside the virtual space, and thereby initiate speech recognition.

In FIG. 7, the horizontal axis represents the time t. Also, taking the time axis as a base of reference, the content of operations by the user and the timings of the operations are illustrated below along the time axis, while the content of processes by the system receiving the user operations and the timings of the process are illustrated above along the time axis.

In the example illustrated in FIG. 7, at the timing t21, the user starts to move the hand U11 inside the virtual space by gesture input, and at the timing t23, the hand U11 reaches a certain position (for example, the position of the object V11). At this time, the system (that is, the information processing system 1), on the basis of the motion of the hand U11 inside the virtual space, or a detection result of the motion of the user's hand in the real space, predicts (estimates) a subsequent motion of the hand U11 (in other words, a subsequent operation). For example, in the example illustrated in FIG. 7, at the timing t22 earlier than the timing t23, the information processing system 1 predicts that the hand U11 will move to the certain position.

In addition, in the case of predicting that the hand U11 will move to the certain position, the information processing system 1 initiates a process related to the acquisition of sound for speech recognition (and by extension, the speech recognition process) on the basis of the prediction result. For this reason, in the example illustrated in FIG. 7, a user operation based on a gesture to be input subsequently is predicted before the timing t23 at which the hand U11 actually reaches the certain position inside the virtual space, and on the basis of the prediction result of the operation, the process of speech recognition is initiated at the timing t24.

Herein, as a comparison of FIGS. 6 and 7 demonstrates, the information processing system 1 according to the present embodiment is able to initiate the speech recognition process at an earlier timing compared to the example illustrated in FIG. 6. For this reason, as illustrated in FIG. 7, for example, the information processing system 1 is able to initiate the speech recognition process at the timing t24 earlier than the timing t25 at which the user begins to speak for speech recognition. In other words, according to the information processing system 1 according to the present embodiment, even under circumstances in which a gesture detection result is used to acquire other input information, such as speech or the like, it is possible to further mitigate the effect of a delay associated with recognizing the gesture, thereby enabling the acquisition of the other input information in a more favorable mode.

<2.2. Functional Configuration>

Figure 8:
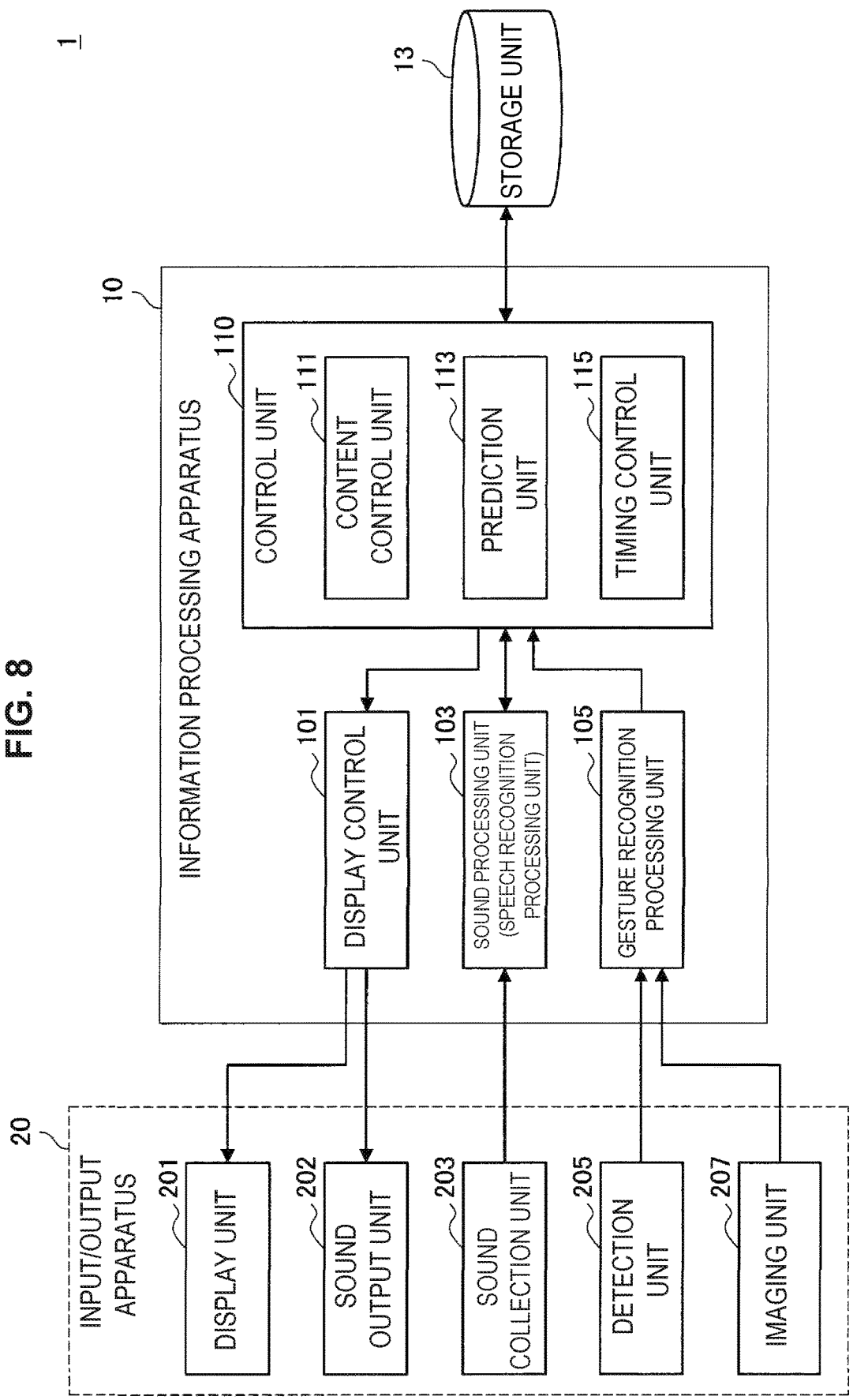
FIG. 8 is a block diagram illustrating an example of a functional configuration of the information processing system according to the embodiment.

Next, FIG. 8 will be referenced to describe an example of the functional configuration of the information processing system 1 according to the present embodiment. FIG. 8 is a block diagram illustrating an example of the functional configuration of the information processing system 1 according to the present embodiment. Note that in this description, to make the features of the information processing system 1 according to the present embodiment easier to understand, the content control apparatus 30 and the sound processing apparatus 40 illustrated in FIG. 3 are configured in an integrated manner as the information processing apparatus 10, and the information processing apparatus 10 and the input/output apparatus 20 are described as operating in conjunction with each other.

As illustrated in FIG. 8, the information processing system 1 according to the present embodiment includes the input/output apparatus 20, the information processing apparatus 10, and a storage unit 13.

The storage unit 13 is a configuration by which the information processing apparatus 10 stores various information for providing content to the user through the input/output apparatus 20. For example, content data may be stored in the storage unit 13. In addition, the data (such as libraries, for example) of programs (applications) by which the information processing apparatus 10 provides content to the user through the input/output apparatus 20, and various control information (such as settings files, for example) may also be stored in the storage unit 13.

Herein, the configuration of the input/output apparatus 20 will be focused on. The input/output apparatus 20 includes a display unit 201, a sound output unit 202, and a sound collection unit 203. The display unit 201 and the sound collection unit 203 correspond to the display unit 201 and the sound collection unit 203 described with reference to FIG. 1. Also, the sound output unit 202 includes a sound device such as what is called a speaker or the like, and outputs voice and sound.

In addition, the input/output apparatus 20 may also include at least one of a detection unit 205 and an imaging unit 207. The detection unit 205 and the imaging unit 207 are configurations for detecting an action by a part of the user, such as the head or hand.

For example, the detection unit 205 includes various sensors, such as an acceleration sensor, a gyro sensor (angular velocity sensor), and the like, detects changes in the position and facing of a part of the user with the sensors, and acquires the detection result as information for recognizing an action by the part. More specifically, for example, the detection unit 205 may detect changes in the position and facing of the housing of the input/output apparatus 20, and acquire the detection result as information for recognizing an action by the head of the user wearing the input/output apparatus 20.

Also, as another example, the detection unit 205 may also acquire a detection result of changes in the position and facing of an apparatus worn on the user's hand (or gripped in the hand) by a sensor of the apparatus as information for recognizing an action by the hand of the user.

Also, the imaging unit 207 captures an image whose subject is a part of the user, such as the hand, and thereby acquires the image as information for recognizing an action by the part imaged as the subject in the image. Additionally, the imaging unit 207 may also be configured to be able to detect the depth direction of the subject, like what is called a depth sensor or the like. Additionally, the imaging unit 207 may capture an image of the user's eyes, and thereby acquire the image as information for detecting the gaze direction of the user on the basis of what is called eye-tracking technology.

Next, the configuration of the information processing apparatus 10 will be focused on. The information processing apparatus 10 includes an output control unit 101, a sound processing unit 103, a gesture recognition processing unit 105, and a control unit 110. Also, the control unit 110 includes a content control unit 111, a prediction unit 113, and a timing control unit 115.

The output control unit 101 is a configuration for controlling the presentation of information to the user through the input/output apparatus 20. For example, the output control unit 101 causes the display unit 201 to display an image on the basis of a content playback result by the control unit 110 described later (more specifically, the content control unit 111). With this arrangement, for example, a picture inside the virtual space provided by the content is presented to the user through the display unit 201. Also, the output control unit 101 causes the sound output unit 202 to output sound such as voice, on the basis of a content playback result by the control unit 110. With this arrangement, for example, sound inside the virtual space provided by the content is presented to the user through the sound output unit 202.

The sound processing unit 103 acquires a sound collection result of sound (such as speech, for example) from the sound collection unit 203, and performs various sound analysis processes on the sound collection result. As a more specific example, the sound processing unit 103 may also perform what is called a speech recognition process on the sound collection result of sound, and thereby convert the sound into text information. In addition, at this point the sound processing unit 103 may perform sound analysis processes such as what is called a beamforming process on the sound collection result of sound to thereby suppress other sounds (also called noise) other than the user's speech, and perform the speech recognition process on the result of the sound analysis process. Subsequently, the sound processing unit 103 outputs the result of the sound processes such as speech recognition to the control unit 110.

Additionally, the sound processing unit 103 may also control the timings of processes related to the acquisition of sound to be subjected to speech recognition (in other words, the sound collection result of sound) and the timings of sound analysis processes such as speech recognition, on the basis of control from the control unit 110 described later (more specifically, the timing control unit 115).

The gesture recognition processing unit 105 is a configuration for recognizing an action (that is, a gesture) by a part such as the user's hand, on the basis of information acquired by the input/output apparatus 20.

For example, the gesture recognition processing unit 105 may also acquire information for recognizing an action by the head of the user wearing the input/output apparatus 20, based on a detection result of changes in the position and facing of the housing of the input/output apparatus 20 from the detection unit 205. With this arrangement, the gesture recognition processing unit 105 is able to recognize an action (for example, changes in position and facing) of the user's head on the basis of information acquired from the detection unit 205, and by extension, is also able to specify the gaze direction of the user on the basis of a recognition result of the action by the head.

Additionally, the gesture recognition processing unit 105 may also acquire, from the detection unit 205, information for recognizing an action by the user's hand, based on a detection result of changes in the position and facing of an apparatus worn on the user's hand by a sensor of the apparatus. With this arrangement, the gesture recognition processing unit 105 becomes able to recognize an action (that is, changes in position and facing) of the user's hand, on the basis of information acquired from the detection unit 205.

Also, as another example, the gesture recognition processing unit 105 may acquire an image captured by the imaging unit 207, and recognize an action by a part imaged in the image by performing an image analysis process on the acquired image. Additionally, at this point the gesture recognition processing unit 105 may also recognize the position in the depth direction of the part imaged in the image, on the basis of an image captured by the imaging unit 207 configured as what is called a depth sensor.

More specifically, the gesture recognition processing unit 105 extracts geometric features of a target part (for example, a hand) from an acquired image, and on the basis of the extraction result, extracts the part imaged in the image. With this arrangement, the gesture recognition processing unit 105 becomes able to recognize the relative position and facing of the part with respect to the imaging unit 207. Additionally, by recognizing the position and facing of the imaging unit 207, the gesture recognition processing unit 105 may also recognize the absolute position of the part in the image captured by the imaging unit 207. For example, the gesture recognition processing unit 105 is able to recognize the position and facing of the imaging unit 207 installed in the input/output apparatus 20 on the basis of a recognition result of the position and facing of the input/output apparatus 20 (in other words, a recognition result of the gaze direction of the user).

Additionally, the gesture recognition processing unit 105 may also acquire an imaging result of an image of the user's eyes from the imaging unit 207, and by using the acquired image as a base of reference, recognize an action by the user's eye on the basis of what is called eye-tracking technology. At this time, the gesture recognition processing unit 105 may also specify the gaze direction of the user in greater detail, on the basis of the recognition result of an action by the user's head, and a recognition result of an action by the user's eyes.

Also, as another example, the gesture recognition processing unit 105 may perform image analysis on an acquired image, and thereby recognize a change in the shape of a part (for example, a hand) extracted from the image as an action by the part.

Subsequently, the gesture recognition processing unit 105 outputs information indicating the recognition result of an action by a part such as the user's head or hand and an action by the user's eyes to the control unit 110. With this arrangement, the control unit 110 is able to recognize the content of an operation performed by the user (in other words, the content of an instruction from the user), on the basis of the recognition result of the action by the part, the recognition result of the action by the eyes, and the like.

The content control unit 111 is a configuration corresponding to the content control apparatus 30 described earlier. Specifically, the content control unit 111 reads out the data of corresponding content from the storage unit 13 on the basis of an instruction from the user through the input/output apparatus 20, and plays back the content. Subsequently, the content control unit 111 outputs output information such as an image and sound based on the playback result of the content to the output control unit 101.

Also, at this time the content control unit 111 may also execute processes based on VR technology, AR technology, or the like in accordance with the type or subject of the content to be played back.

Additionally, the content control unit 111 may also acquire information indicating the recognition result of an action by a part such as the user's head or hand and a recognition result of an action by the eyes from the gesture recognition processing unit 105, and on the basis of the acquired information, recognize the content of the operation by the user.

For example, the content control unit 111 may also recognize a change in the gaze direction of the user on the basis of a recognition result of an action by the user's head. Additionally, at this time the content control unit 111 may also combine a recognition result of an action by the user's head and a recognition result of an action by the user's eyes to thereby recognize a change in the gaze direction of the user in greater detail. Furthermore, the content control unit 111 may also generate a picture in the virtual space indicated by the gaze direction of the user on the basis of VR technology, for example, and output the generated picture inside the virtual space to the output control unit 101. With such a configuration, by moving one's gaze direction so as to look around, for example, the user becomes able to perceive, through the input/output apparatus 20, a picture inside the virtual space corresponding to one's own gaze direction.

Additionally, on the basis of a recognition result of an action by the user's hand, the content control unit 111 may recognize the content of an operation using the hand (for example, user instruction content based on gesture input), and execute a process corresponding to the recognition result.

As a specific example, the content control unit 111 may recognize the content of an operation on the virtual object V11 by the hand U11 of the user inside the virtual space on the basis of VR technology, and execute a process corresponding to the content of the operation. Also, as another example, the content control unit 111 may recognize the content of an operation by the user's hand (a hand in the real space) on a virtual object presented to the user on the basis of AR technology, and execute a process corresponding to the content of the operation. Also, as another example, the content control unit 111 may recognize the shape of the user's hand, and execute a process corresponding to the recognition result of the shape.

The prediction unit 113 acquires information indicating a recognition result of a gesture such as an action by a part such as the user's head or hand and an action by the user's eyes from the gesture recognition processing unit 105, and on the basis of the acquired information, predicts a subsequently input gesture (and by extension, the operation based on the gesture).

For example, the prediction unit 113 may recognize the direction and speed in which the hand moves on the basis of changes in the position and facing of the user's hand, and on the basis of the recognition result, predict a subsequent action by the hand and a movement destination (that is, a position) of the hand. Additionally, on the basis of changes in the shape of the user's hand, the prediction unit 113 may also predict a changed shape of the hand. Additionally, by applying a Kalman filter or the like by treating changes in at least one of the position, facing, action, shape, and the like of the user's hand as observation data, the prediction unit 113 may predict the subsequent position, facing, action, shape, and the like of the hand. The same applies to the case of dealing with actions by the user's head, actions by the user's eyes, and the like.

Also, as another example, in accordance with an action by an object based on a recognition result of a gesture input from the user, the prediction unit 113 may also predict a subsequent action by the object (and by extension, the content of an operation for making the object perform the action).

As a specific example, on the basis of changes in the position and facing of the virtual hand U11 in the virtual space corresponding to a recognition result of a gesture input by the user, the prediction unit 113 may recognize the direction and speed in which the hand U11 moves, and on the basis of the recognition result, predict the subsequent movement destination of the hand U11. Additionally, on the basis of changes in the shape of the virtual hand U11, the prediction unit 113 may also predict a changed shape of the hand. Additionally, by applying a Kalman filter or the like by treating changes in the position, facing, shape, and the like of the virtual hand U11 as observation data, the prediction unit 113 may predict the subsequent position, facing, shape, and the like of the hand U11.

As above, the prediction unit 113 predicts an operation based on a subsequently input gesture, in accordance with a recognition result of a gesture (for example, an action by a part such as the head or hand) input by the user, or an action by an object based on the recognition result. Subsequently, the prediction unit 113 outputs information indicating the prediction result of the operation to the timing control unit 115.

The timing control unit 115 acquires information indicating the prediction result of an operation based on a subsequently input gesture from the prediction unit 113, and on the basis of the prediction result, controls the execution of various processes. For example, in the case of recognizing that the operation indicated by the prediction result is an operation for giving an instruction to execute the speech recognition process, the timing control unit 115 instructs the sound processing unit 103 to initiate the speech recognition process (or a process related to the acquisition of sound for speech recognition) in anticipation of the execution of the operation. Also, after giving an instruction to initiate the speech recognition process, in the case of recognizing that an operation indicated by the next acquired prediction result is not an operation for giving an instruction to execute the speech recognition process (that is, in the case in which the previous prediction is inaccurate), the timing control unit 115 may instruct the sound processing unit 103 to end the speech recognition process.

Note that a more specific example of the operations of the prediction unit 113 and the timing control unit 115, or in other words, a process related to the prediction of an action by the user and a process related to the control of various processes based on the prediction result, will be described separately as a working example.

The above references FIG. 8 to describe an example of a functional configuration of the information processing system 1 according to the present embodiment. Note that the functional configuration described above is merely one example, and is not necessarily limited to the example illustrated in FIG. 8. As a specific example, as described earlier, the information processing apparatus 10 and the input/output apparatus 20 may also be configured in an integrated manner. Also, as another example, the configuration of a part of each configuration of the information processing apparatus 10 may also be provided externally to the information processing apparatus 10. As a more specific example, at least part of the configuration corresponding to the control unit 110 (that is, the content control unit 111, the prediction unit 113, and the timing control unit 115) may be provided in a server connected to the information processing apparatus 10 through a network.

<2.3. Process>

Figure 9:
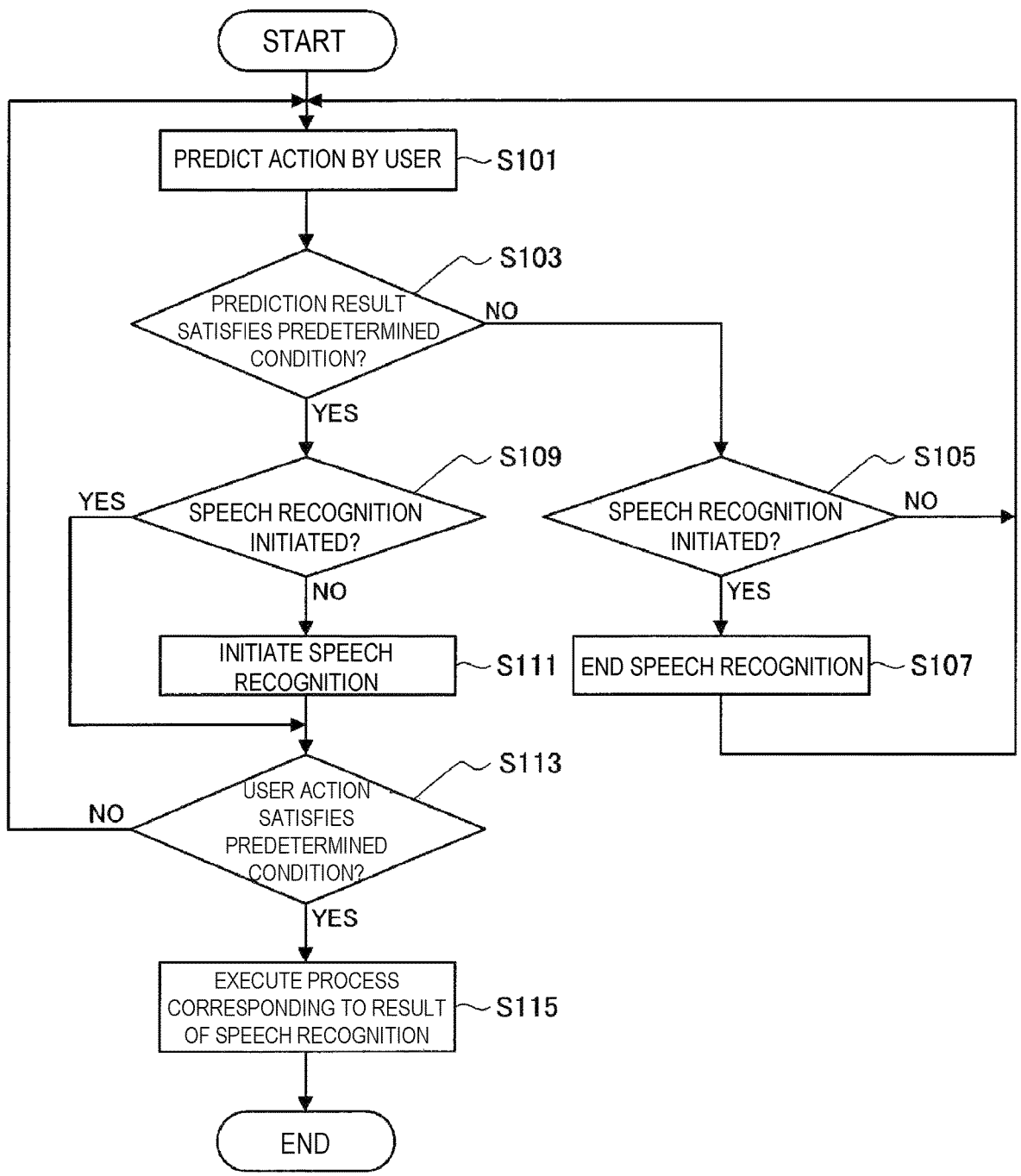
FIG. 9 is a flowchart illustrating an example of the flow of a series of operations of the information processing system according to the embodiment.

Next, FIG. 9 will be referenced to describe an example of the flow of a series of operations of the information processing system 1 according to the present embodiment, with particular focus on the operations of the information processing apparatus 10. FIG. 9 is a flowchart illustrating an example of the flow of a series of operations of the information processing system 1 according to the present embodiment. Note that in this description, an example of the flow of the series of operations of the information processing system 1 is described with focus on a case in which the information processing apparatus 10 predicts, on the basis of a recognition result of an action by a part such as the user's head or hand, an operation based on a subsequently input gesture (that is, an action by the part).

The gesture recognition processing unit 105 recognizes an action by a part such as the user's head or hand on the basis of information indicating a detection result by the detection unit 205 or an image captured by the imaging unit 207, and outputs information indicating the recognition result to the control unit 110. On the basis of the information indicating the recognition result of the action by a part such as the user's head or hand, the control unit 110 predicts an operation based on a subsequently input gesture (that is, an action by the part) (S101).

Subsequently, in the case in which the prediction result of the operation satisfies a predetermined condition for initiating speech recognition (S103, YES) and the speech recognition process has not been initiated (S109, NO), the control unit 110 instructs the sound processing unit 103 to initiate the speech recognition process. Upon receiving the instruction, the sound processing unit 103 initiates the acquisition of a sound collection result of sound (such as speech, for example) from the sound collection unit 203, and the speech recognition process based on the sound collection result (S111). Note that in the case in which the process related to the acquisition of the sound collection result and the speech recognition process have already been initiated at this time (S109, YES), the control unit 110 does not have to instruct the sound processing unit 103 to initiate the speech recognition process.

Also, in the case in which the prediction result of the operation does not satisfy the predetermined condition (S103, NO) and the speech recognition process has been initiated by the previous prediction result (S105, YES), the control unit 110 instructs the sound processing unit 103 to end the speech recognition process. Upon receiving the instruction, the sound processing unit 103 ends the acquisition of a sound collection result of sound from the sound collection unit 203, and the speech recognition process on the sound collection result (S107). Note that in the case in which the process related to the acquisition of the sound collection result and the speech recognition process have not been initiated at this time (S105, NO), the control unit 110 does not have to instruct the sound processing unit 103 to end the speech recognition process.

The control unit 110 continues the above operations (step S113, NO) until an operation based on a gesture input by the user (that is, an operation based on a recognition result of an action by a part such as the head or hand) satisfies the predetermined condition which indicates that the user is giving an instruction to initiate speech recognition. Additionally, in the case in which an operation based on a gesture input by the user satisfies the predetermined condition (S113, YES), the control unit 110 executes a process corresponding to the result of the executed speech recognition process (S115).

Note that in step S115 and thereafter, the mechanism for ending the initiated speech recognition process is not particularly limited. As a specific example, the information processing apparatus 10 may receive an explicit instruction from the user, and instruct the sound processing unit 103 to end the speech recognition process. Also, as another example, in the case of detecting that the user's utterance has ended by detecting a silent interval or the like, the information processing apparatus 10 may instruct the sound processing unit 103 to end the speech recognition process.

Note that in the series of processes illustrated from steps S101 to S113, the information processing apparatus 10 may also be configured to instruct the sound processing unit 103 to end the speech recognition process only in the process illustrated in step S107. In this case, even in the case in which an instruction to end the speech recognition process is given explicitly from the user, as long as the process illustrated in step S107 is not executed, the information processing apparatus 10 may cause the sound processing unit 103 to continue the speech recognition process.

The above references FIG. 9 to describe an example of the flow of a series of operations of the information processing system 1 according to the present embodiment, with particular focus on the operations of the information processing apparatus 10.

<2.4. Working Example>

Next, as a working example of the information processing system 1 according to the present embodiment, an example of operations in which the information processing apparatus 10 predicts an operation based on gesture input and executes a process in accordance with the prediction result will be described.

(Prediction Based on Distance to Object)

Figure 10:
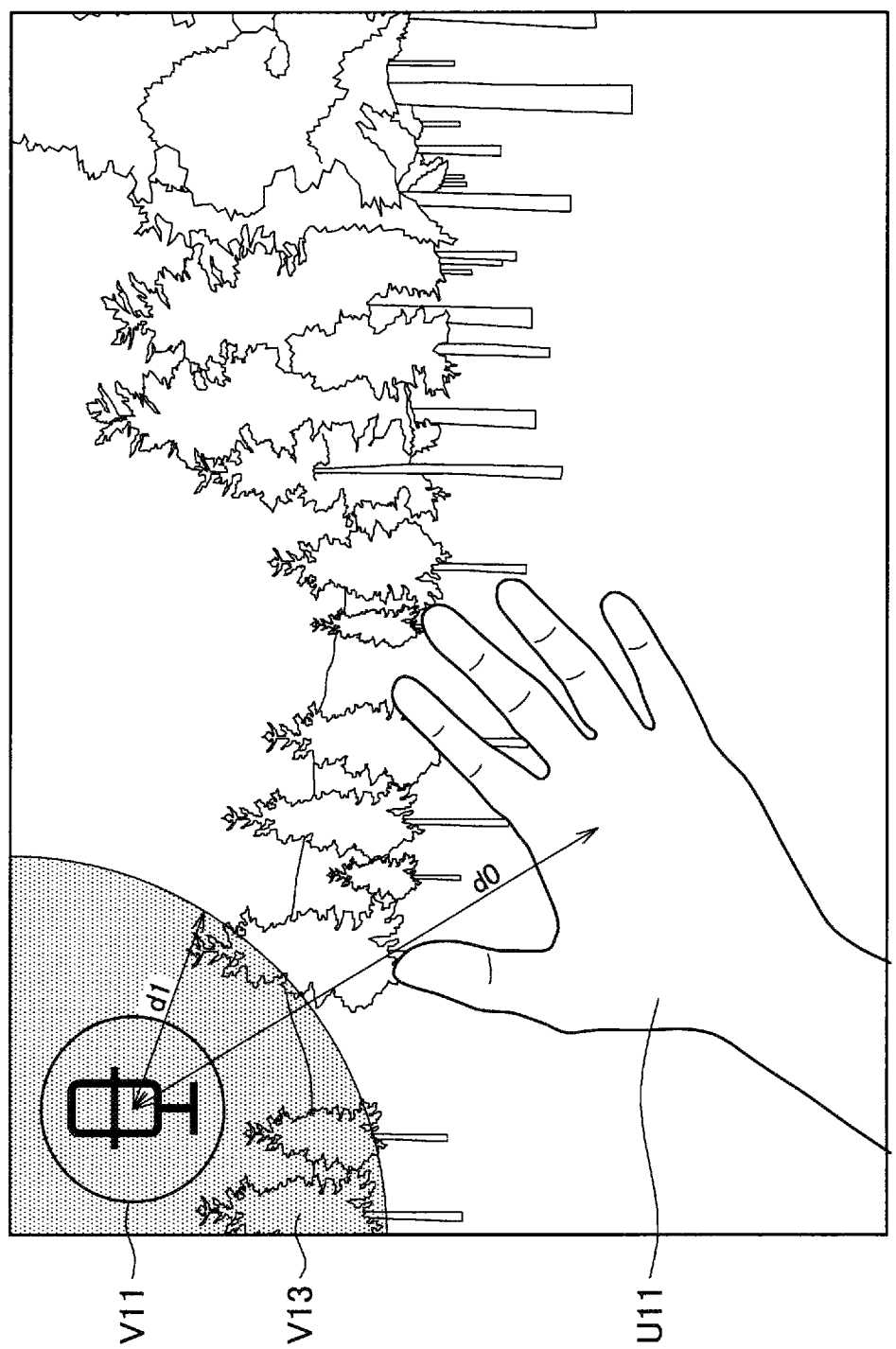
FIG. 10 is an explanatory diagram for explaining an example of operations of an information processing apparatus according to a working example of the embodiment.

For example, FIG. 10 is an explanatory diagram for explaining an example of operations of the information processing apparatus 10 according to the working example of the present embodiment. Like the example described with reference to FIG. 5, FIG. 10 illustrates an example of a case in which the user operates a virtual hand U11 inside a virtual space by gesture input, and by overlapping the hand U11 with an object V11, gives an instruction to initiate a speech recognition process. In the example illustrated in FIG. 10, the information processing apparatus 10 computes a distance d0 between the hand U11 and the object V11. Additionally, on the basis of the computation result of the distance d0, the information processing apparatus 10 predicts whether or not the hand U11 will move to the position of the object V11 (and by extension, whether or not an operation will be performed on the object V11 by the hand U11) in response to a subsequently input gesture.

More specifically, in the case in which the distance d0 between the hand U11 and the object V11 has become a predetermined distance d1 or less, the information processing apparatus 10 predicts that an operation will be performed on the object V11 by the hand U11. In other words, in FIG. 10, in the case of recognizing that the hand U11 has entered the region denoted by the reference sign V13, the information processing apparatus 10 predicts that an operation will be performed on the object V11 by the hand U11.

Additionally, in the case of predicting that an operation will be performed on the object V11 by the hand U11, the information processing apparatus 10 initiates the speech recognition process associated with the object V11.

Note that in the example illustrated in FIG. 10, a situation may be anticipated in which, even though the distance d0 between the hand U11 and the object V11 becomes the distance d1 or less and the speech recognition process is launched, thereafter, the hand U11 does not move to the position of the object V11. In anticipation of such a situation, for example, in the case of recognizing that the distance d0 between the hand U11 and the object V11 has exceeded the distance d1, the information processing apparatus 10 may end the speech recognition process being executed. Also, in this case, the information processing apparatus 10 does not have to execute a process based on the ended speech recognition process, or may discard the recognition result.

(Prediction Based on Velocity Vector)

Figure 11:
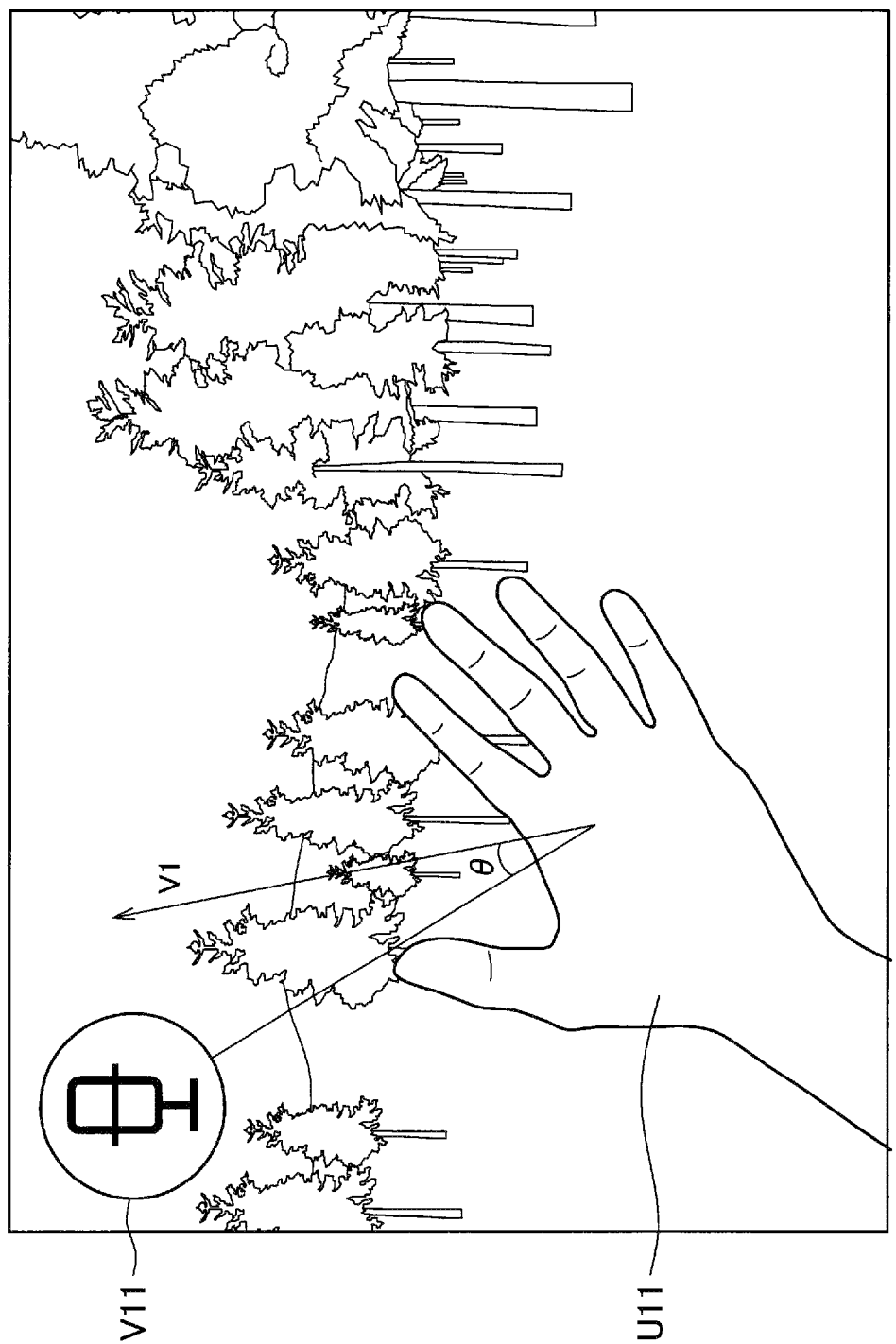
FIG. 11 is an explanatory diagram for explaining another example of operations of an information processing apparatus according to a working example of the embodiment.

Also, FIG. 11 is an explanatory diagram for explaining another example of operations of the information processing apparatus 10 according to the working example of the present embodiment. Like the example described with reference to FIG. 5, FIG. 11 illustrates an example of a case in which the user operates a virtual hand U11 inside a virtual space by gesture input, and by overlapping the hand U11 with an object V11, gives an instruction to initiate a speech recognition process. In the example illustrated in FIG. 11, the information processing apparatus 10 computes a velocity vector V1 on the basis of the movement direction of the hand U11 and the movement speed of the hand U11. Additionally, on the basis of the computation result of the velocity vector V1, the information processing apparatus 10 predicts whether or not the hand U11 will move to the position of the object V11 (and by extension, whether or not an operation will be performed on the object V11 by the hand U11) in response to a subsequently input gesture.

For example, the angle θ illustrated in FIG. 11 indicates the angle between a line connecting the hand U11 and the object V11, and the direction in which the hand U11 moves. In other words, the smaller the angle θ, the higher the probability that the hand U11 is moving in the direction of the object V11. Utilizing such characteristics, on the basis of the direction in which the velocity vector V1 is pointing (in other words, the angle θ) and the magnitude of the velocity vector V1 (that is, the movement speed of the hand U11), the information processing apparatus 10 predicts the position to which the hand U11 will subsequently move (that is, the movement destination of the hand U11). With this arrangement, on the basis of a prediction result of the movement destination of the hand U11, the information processing apparatus 10 becomes able to predict whether or not an operation will be performed on the object V11 by the hand U11.

Additionally, in the case of predicting that an operation will be performed on the object V11 by the hand U11, the information processing apparatus 10 initiates the speech recognition process associated with the object V11.

Note that in the example illustrated in FIG. 11, a situation may be anticipated in which, even though the speech recognition process is launched on the basis of a prediction result of the movement destination of the hand U11 based on the velocity vector V1, thereafter, the hand U11 does not move to the position of the object V11. In anticipation of such a situation, for example, in the case of recognizing that the hand U11 has moved away from the object V11 on the basis of a newly computed velocity vector V1, the information processing apparatus 10 may end the speech recognition process being executed. Also, in this case, the information processing apparatus 10 does not have to execute a process based on the ended speech recognition process, or may discard the recognition result.

(Prediction Based on Shape)

Figure 12:
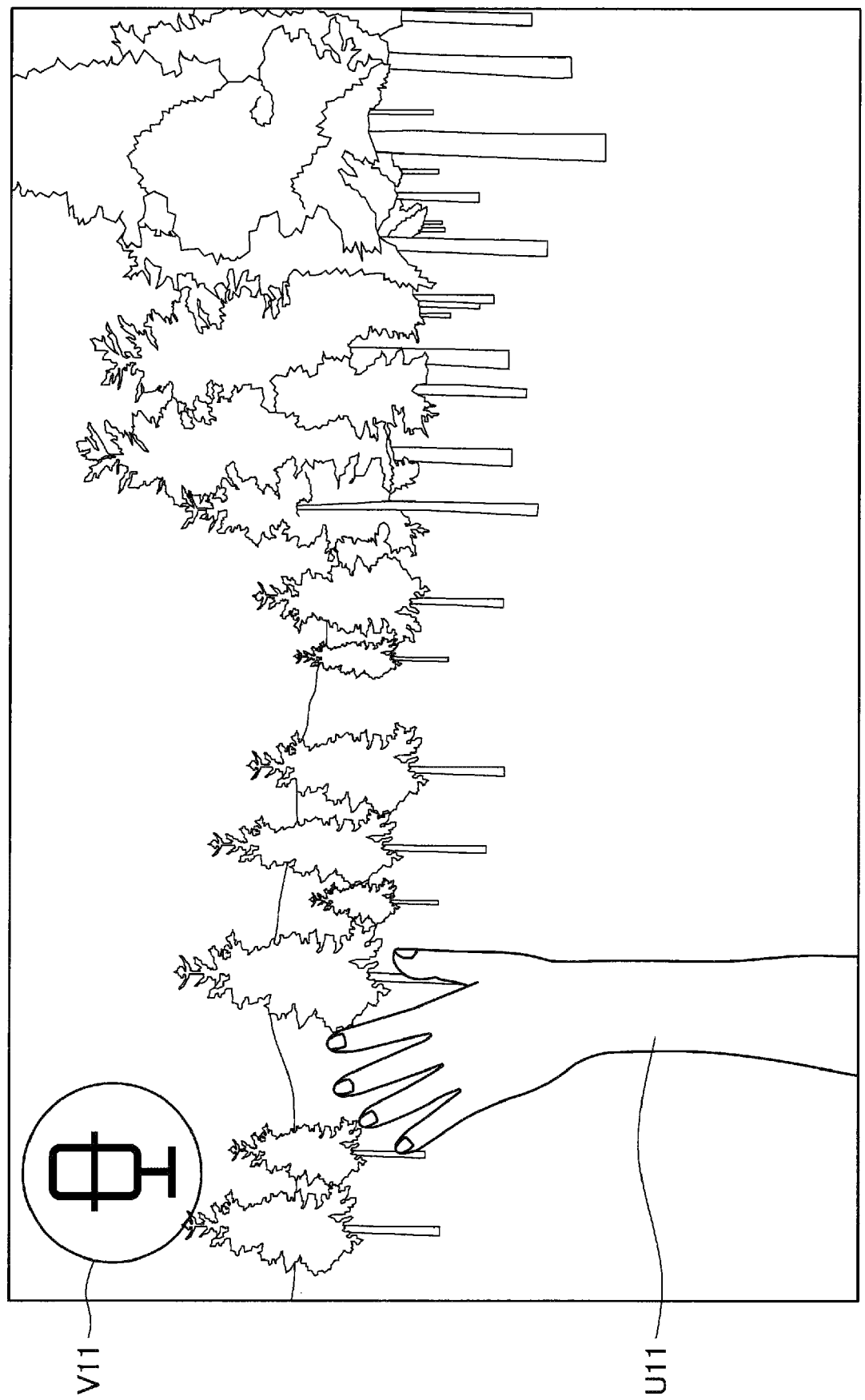
FIG. 12 is an explanatory diagram for explaining another example of operations of an information processing apparatus according to a working example of the embodiment.

Also, FIG. 12 is an explanatory diagram for explaining another example of operations of the information processing apparatus 10 according to the working example of the present embodiment. FIG. 12 illustrates an example of a case in which the user operates the virtual hand U11 inside the virtual space by gesture input, and by grasping the object V11 with the hand U11, gives an instruction to initiate the speech recognition process. In the example illustrated in FIG. 12, the information processing apparatus 10 recognizes the shape of the hand U11, and in accordance with the recognition result of the shape, predicts whether or not the shape of the hand U11 will become a shape grasping the object V11 (and by extension, whether or not an operation will be performed on the object V11 by the hand U11) in response to a subsequently input gesture.

Specifically, the information processing apparatus 10 computes the similarity between the recognition result of the shape of the hand U11 and a predetermined shape (that is, the shape when the hand U11 grasps an object). As a more specific example, the information processing apparatus 10 may compute features on the basis of the recognition result of the shape of the hand U11, and compute the similarity on the basis of a comparison result with features expressing the predetermined shape. Additionally, in the case of recognizing that the computation result of the similarity is a threshold value or greater (for example, in the case in which the shape of the hand U11 generally resembles the shape when grasping an object), the information processing apparatus 10 predicts that an operation will be performed on the object V11 by the hand U11.

Additionally, in the case of predicting that an operation will be performed on the object V11 by the hand U11, the information processing apparatus 10 initiates the speech recognition process associated with the object V11.

Note that in the example illustrated in FIG. 12, a situation may be anticipated in which, even though the speech recognition process is launched on the basis of a prediction result of the shape of the hand U11, thereafter, the shape of the hand U11 does not become the predetermined shape (for example, the shape grasping an object). In anticipation of such a situation, for example, in the case of recognizing that the similarity between the recognition result of the shape of the hand U11 and the predetermined shape is less than the threshold value, the information processing apparatus 10 may end the speech recognition process being executed. Also, in this case, the information processing apparatus 10 does not have to execute a process based on the ended speech recognition process, or may discard the recognition result.

(Prediction Based on Kalman Filter)

Figure 13:
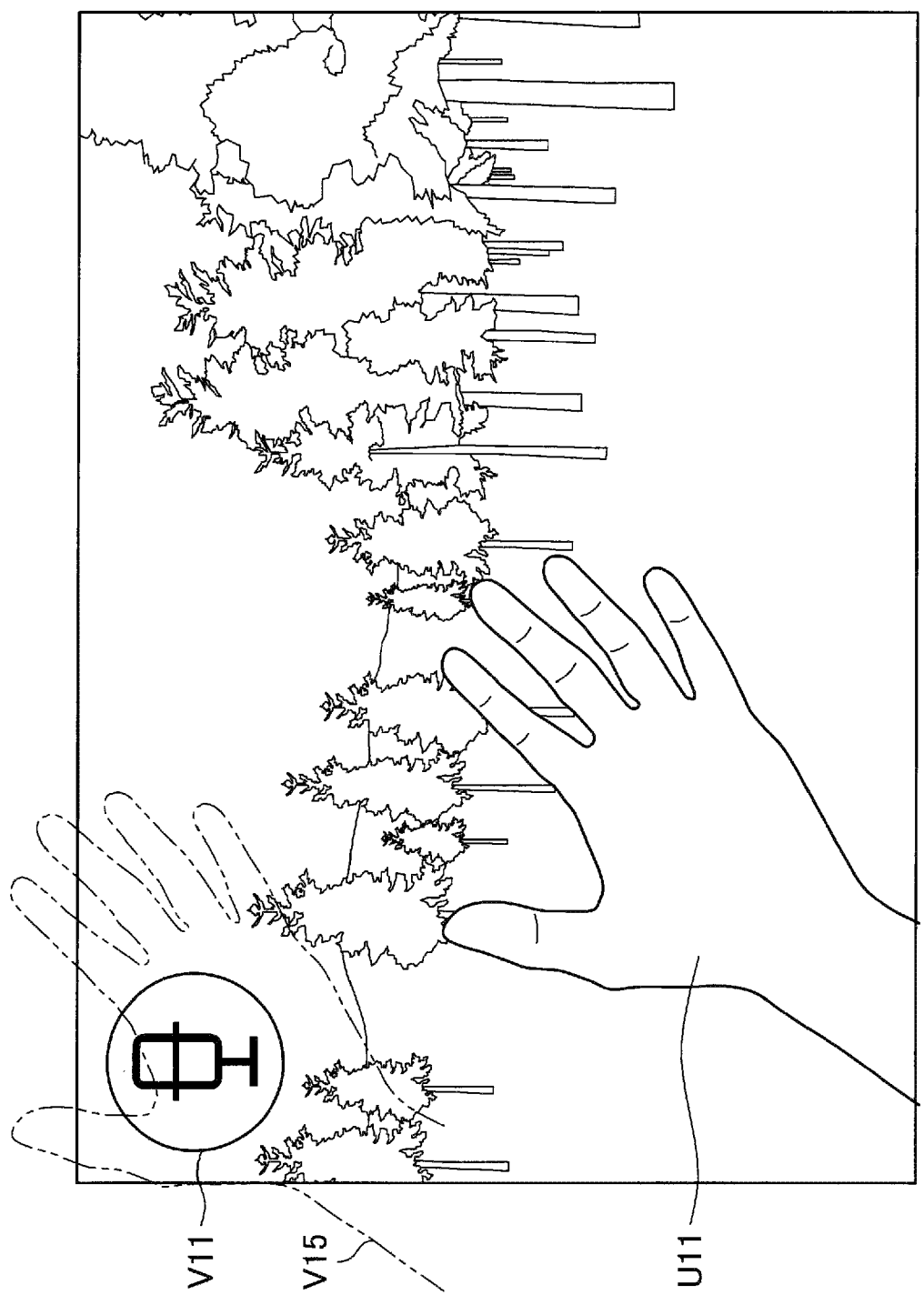
FIG. 13 is an explanatory diagram for explaining another example of operations of an information processing apparatus according to a working example of the embodiment.

Also, FIG. 13 is an explanatory diagram for explaining another example of operations of the information processing apparatus 10 according to the working example of the present embodiment. Like the example described with reference to FIG. 5, FIG. 13 illustrates an example of a case in which the user operates a virtual hand U11 inside a virtual space by gesture input, and by overlapping the hand U11 with an object V11, gives an instruction to initiate a speech recognition process. In the example illustrated in FIG. 13, the information processing apparatus 10 applies a Kalman filter by treating changes in the position and facing of the virtual hand U11 as observation data, and thereby predicts whether or not the hand U11 will move to the position of the object V11 (and by extension, whether or not an operation will be performed on the object V11 by the hand U11) in response to a subsequently input gesture.

For example, in FIG. 13, the reference sign V15 denotes a prediction result of the movement destination of the hand U11 based on the application result of the Kalman filter. In other words, as illustrated in FIG. 13, in the case in which the prediction result V15 of the movement destination of the hand U11 and the position of the object V11 approximately match, the information processing apparatus 10 predicts that an operation will be performed on the object V11 by the hand U11.

Additionally, in the case of predicting that an operation will be performed on the object V11 by the hand U11, the information processing apparatus 10 initiates the speech recognition process associated with the object V11.

Note that in the example illustrated in FIG. 13, similarly to the example illustrated in FIGS. 10 and 11, a situation may be anticipated in which the hand U11 does not move to the position of the object V11, in anticipation of such a situation, for example, it is sufficient for the information processing apparatus 10 to end the speech recognition process being executed at the time of predicting that the hand U11 will not move to the position of the object V11, on the basis of the prediction result of the movement destination of the hand U11 based on the application result of the Kalman filter. Also, in this case, the information processing apparatus 10 does not have to execute a process based on the ended speech recognition process, or may discard the recognition result.

The above references FIGS. 10 to 13 to describe, as a working example of the information processing system 1 according to the present embodiment, an example of operations in which the information processing apparatus 10 predicts an operation based on gesture input and executes a process in accordance with the prediction result will be described. Note that the example described above is merely one example, and insofar as the information processing apparatus 10 is capable of predicting an operation based on a subsequently input gesture on the basis of a gesture recognition result, the method is not particularly limited. Also, two or more prediction methods from among the examples of prediction methods described above may be combined. For example, the information processing apparatus 10, by utilizing a computation result of the distance d0 between the hand U11 and the object V11 and a computation result of the velocity vector V1 of the hand U11, may improve the accuracy of predicting whether or not the hand U11 will move to the position of the object V11.

Additionally, the information processing apparatus 10 may also notify the user of various information in accordance with a prediction result of an operation based on gesture input. For example, on the basis of a prediction result of an operation based on gesture input, the information processing apparatus 10 may notify the user, through the input/output apparatus 20, of the status of acquiring sound for speech recognition and the status of the speech recognition. As a more specific example, in the case in which speech recognition is initiated on the basis of a prediction result of an operation based on gesture input, the information processing apparatus 10 may notify the user of information indicating that the speech recognition has been initiated. Note that the method of information notification and the medium for notification by the information processing apparatus 10 is not particularly limited. As a specific example, the information processing apparatus 10 may notify the user of information by presenting display information visualizing the information to be reported on an image (screen) presented to the user through the input/output apparatus 20. Also, as another example, the information processing apparatus 10 may also notify the user of information by outputting voice and sound indicating the information to be reported through a sound device such as a speaker.

Also, the examples described above focus on the case of predicting an operation on the object V11 by the virtual hand U11 on the basis of VR technology, but are not necessarily limited to only the same mode. As a specific example, it is possible to execute similar control even in the case of predicting an operation by a part such as a hand in a real space on a virtual object superimposed onto the real space on the basis of AR technology. In other words, the information processing apparatus 10 may also predict an action by a part such as a hand, and in accordance with the prediction result, execute a process associated with the object.

<2.5. Modification 1: Example of Combination with Machine Learning>

Next, as Modification 1 of the present embodiment, an example of control in the case of accumulating the results of the speech recognition process as teaching data for what is called machine learning will be described.

As described above, in the information processing system 1 according to the present embodiment, an operation based on gesture input is predicted, and in accordance with the prediction result, a speech recognition process is initiated in advance, before an operation giving an instruction to execute the speech recognition process is actually performed. On the other hand, the operation is not necessarily performed as predicted, and in the case in which the prediction is inaccurate, the result of the speech recognition process initiated in advance is not used in some cases. The unused result of the speech recognition process is data acquired when the user is not actually intending to input information through speech. For this reason, if the data indicating the results of such speech recognition processes is accumulated as teaching data for machine learning, the teaching data becomes what is called noise, and cases in which the accuracy of prediction based on the results of machine learning becomes lowered are also anticipated.

Accordingly, as Modification 1, an example of a mechanism for controlling data so that the data not actually used is not accumulated as teaching data from among the data indicating the result of the speech recognition process acquired on the basis of a prediction result of an operation based on gesture input will be described.

Figure 14:
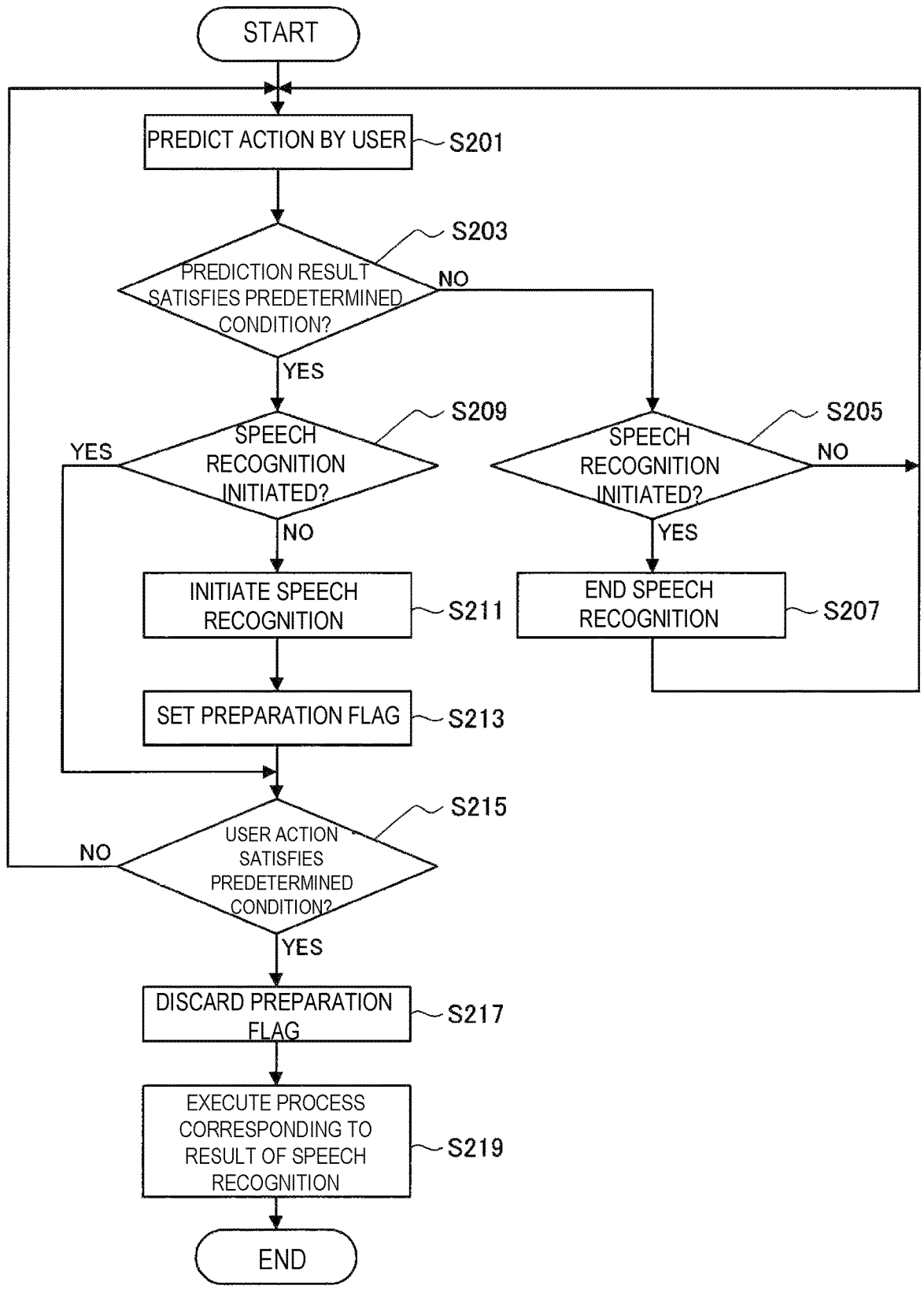
FIG. 14 is a flowchart illustrating an example of the flow of a series of processes of an information processing system according to Modification 1 of the embodiment.

For example, FIG. 14 is a flowchart illustrating an example of the flow of a series of processes of the information processing system 1 according to Modification 1 of the present embodiment. As illustrated in FIG. 14, the information processing system 1 according to Modification 1 is different from the operations of the information processing system 1 according to the embodiment described above (see FIG. 9) in that a setting of a preparation flag and a process related to discarding, illustrated as the reference signs S213 and S217, have been added. Accordingly, in the present description, an example of the flow of the series of processes by the information processing system 1 according to Modification 1 will be described with particular focus on the portion that differs from the information processing system 1 according to the embodiment described above. Note that detailed description will be omitted for processes which are substantially similar to the information processing system 1 according to the embodiment described above.

As illustrated in FIG. 14, in the information processing system 1 according to Modification 1, the control unit 110 of the information processing apparatus 10 acquires information indicating a recognition result of an action by a part such as the head or hand of the user from the gesture recognition processing unit 105, and on the basis of the information, predicts an operation based on a subsequently input gesture (S201). Subsequently, in the case in which the prediction result of the operation satisfies a predetermined condition for initiating speech recognition (S203, YES) and the speech recognition process has not been initiated (S209, NO), the control unit 110 instructs the sound processing unit 103 to initiate the speech recognition process (S211). The operations up to this point are similar to the information processing apparatus 10 according to the embodiment described above.

In addition, in the case of instructing the sound processing unit 103 to initiate the speech recognition process, the control unit 110 according to Modification 1 sets a preparation flag with respect to the data indicating the result of the speech recognition process (S213). Additionally, in the case in which an operation based on a gesture input by the user satisfies a predetermined condition (S215, YES), the control unit 110 discards the preparation flag set with respect to the data indicating the result of the executed speech recognition process (S217), and executes a process corresponding to the result of the speech recognition process (S219). Note that the condition related to the setting of the preparation flag corresponds to an example of a "first condition". Also, the condition related to the discarding of the preparation flag corresponds to an example of a "second condition".

On the other hand, in the case in which the prediction result of the operation does not satisfy the predetermined condition (S203, NO) and the speech recognition process has been initiated by the previous prediction result (S205, YES), the control unit 110 instructs the sound processing unit 103 to end the speech recognition process (S207). In this case, the preparation flag remains set with respect to the data indicating the result of the executed speech recognition process.

Additionally, the information processing apparatus 10 according to the present embodiment accumulates as teaching data only the data for which the preparation flag is not set, and does not accumulate as teaching data the data for which the preparation flag is set, from among each of the data acquired as the result of the speech recognition process.

According to a configuration like the above, the information processing apparatus 10 according to Modification 1 is able to prevent the occurrence of a situation in which data for which the result of the speech recognition process was not used, that is, data acquired without the intent of the user, is accumulated as teaching data for machine learning.

The above describes, as Modification 1 of the present embodiment, an example of control in the case of accumulating the results of the speech recognition process as teaching data for what is called machine learning.

<2.6. Modification 2: Optimization of Process Related to Prediction>

Next, as Modification 2 of the present embodiment, an example of control for optimizing a process related to the prediction of an operation based on gesture input will be described.

In the case of utilizing a recognition result of a user action, such as gesture input or the like, as input information from the user, compared to an operation performed via an input device such as a mouse or a controller, in some cases variations occur in the acquired input information due to the influence of the user's physical features, habits, or the like. Particularly, in the information processing system 1 according to the present embodiment, by predicting an operation based on gesture input, for example, a speech recognition process or the like is launched in advance, before the operation is actually performed. For this reason, for example, a situation may be anticipated in which the user's physical features, habits, or the like influence the prediction of an operation, and the speech recognition process is launched against the user's intention, or a case may be anticipated in which the user starts speaking earlier than predicted, and speech recognition fails as a result. In such circumstances, for example, a situation in which the result of the speech recognition process launched in advance is not used by the information processing apparatus 10, a situation in which the result of the speech recognition process is discarded against the user's intention, or the like may be anticipated to occur.

Accordingly, in the case in which a situation of not using the result of the speech recognition process launched on the basis of a prediction result of an operation, or a situation in which the result of the speech recognition process is discarded by the user, occurs frequently, the information processing apparatus 10 according to Modification 2 controls the basis for predicting an operation (that is, the basis of determination with respect to parameters such as distance, a velocity vector, or similarity). Note that in the following description, the basis for predicting an operation based on gesture input is also designated the "predictive quantity". Also, the basis (that is, the predictive quantity) for predicting an operation based on gesture input corresponds to an example of a "third condition". Also, the condition for controlling the predictive quantity described in detail in the following corresponds to an example of a "fourth condition".

Figure 15:
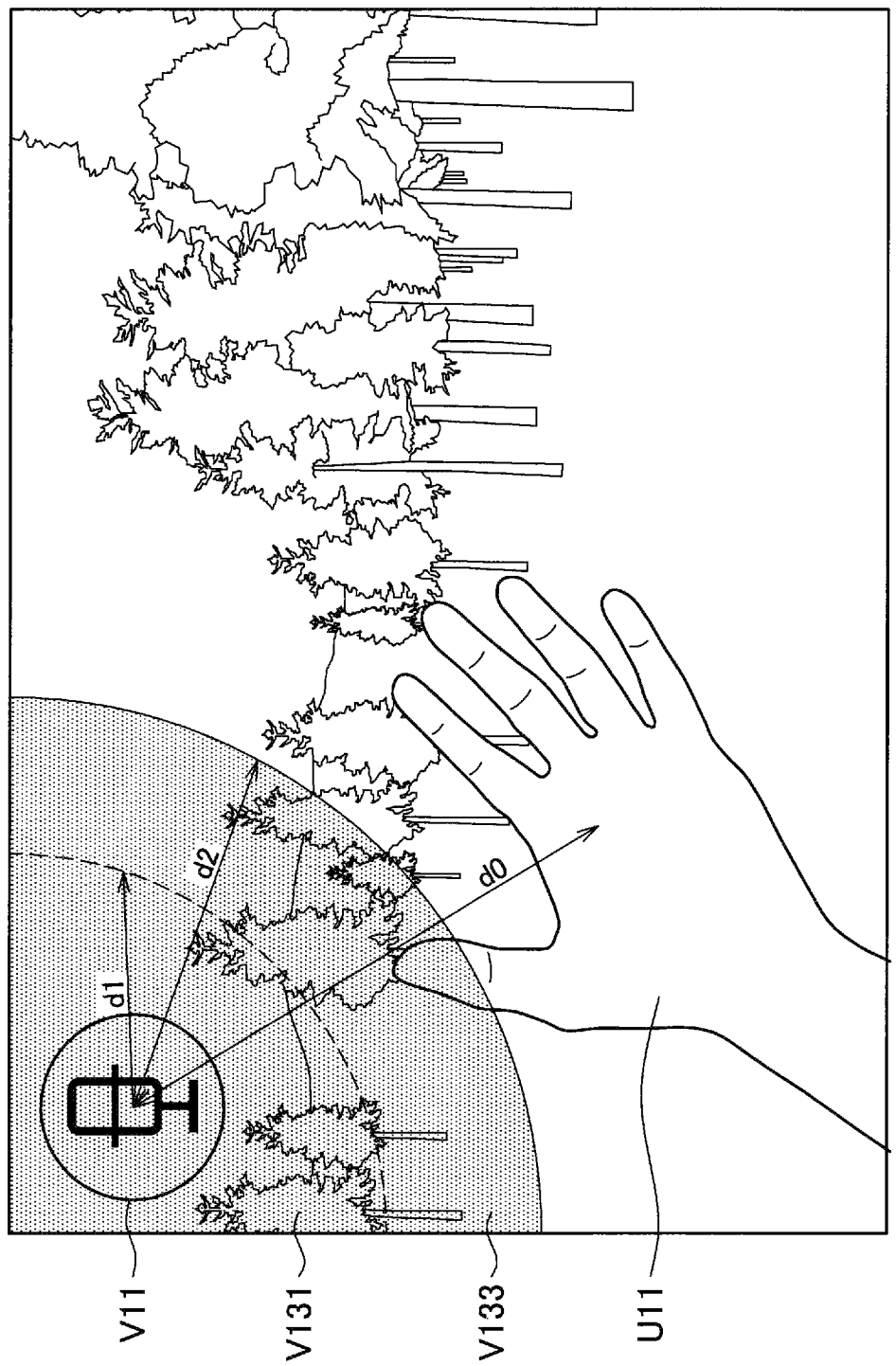
FIG. 15 is an explanatory diagram for explaining an example of operations of an information processing apparatus according to Modification 2 of the embodiment.

For example, FIG. 15 is an explanatory diagram for explaining an example of operations of the information processing apparatus 10 according to Modification 2 of the present embodiment. Note that in this description, like the example described with reference to FIG. 5, it is assumed that the user operates a virtual hand U11 inside a virtual space by gesture input, and by overlapping the hand U11 with an object V11, gives an instruction to initiate a speech recognition process. Also, in the example illustrated in FIG. 15, similarly to the example described with reference to FIG. 10, the information processing apparatus 10 predicts whether or not the hand U11 will move to the position of the object V11 (and by extension, whether or not an operation will be performed on the object V11 by the hand U11) in response to a subsequently input gesture, on the basis of a computation result of the distance d0 between the hand U11 and the object V11. Additionally, in the case of predicting that an operation will be performed on the object V11 by the hand U11 (that is, in the case of predicting that the hand U11 will overlap the object V11), the information processing apparatus 10 initiates the speech recognition process.

For example, assume that in the case in which the distance d0 between the hand U11 and the object V11 becomes a predetermined distance d1 or less (that is, in the case in which the hand U11 enters a region V131), the information processing apparatus 10 predicts that an operation will be performed on the object V11 by the hand U11, and initiates speech recognition.

At this time, with respect to the executed speech recognition process, the information processing apparatus 10 monitors the frequency at which the result of the speech recognition process is not used, or the frequency at which the result of the speech recognition process is discarded by the user (hereinafter, these are collectively designated the "discard ratio"). Additionally, the information processing apparatus 10 controls the predictive quantity in accordance with the monitoring result of the discard ratio.

As a specific example, in the case of the example illustrated in FIG. 15, in the case in which the discard ratio exceeds a threshold value (that is, in the case in which the frequency at which the result of the speech recognition process is discarded increases), the information processing apparatus 10, on the basis of the computation result of the distance d0, changes the predictive quantity for predicting that the hand U11 will move to the position of the object V11 from the distance d1 to a distance d2 that is longer than the distance d1. By such a control, in the case in which the hand U11 enters a region V133 which is wider than the region V131, the information processing apparatus 10 predicts that an operation will be performed on the object V11 by the hand U11. For this reason, compared to before the change of the predictive quantity, the speech recognition process is initiated more easily.

Also, as another example, on the basis of the computation result of the distance d0, the information processing apparatus 10 may also control the predictive quantity for predicting that the hand U11 will move to the position of the object V11 to be a smaller value (for example, from the distance d1 to a shorter distance). By such a control, compared to before the change of the predictive quantity, the speech recognition process is initiated less easily.

In addition, the information processing apparatus 10 may continue monitoring the discard ratio after changing the predictive quantity, and by comparing the discard ratio between before and after the change in the predictive quantity, additionally control the predictive quantity in accordance with the comparison result. As a specific example, in the case in which the discard ratio after the change has increased compared to the discard ratio before the change in the predictive quantity, the information processing apparatus 10 may revert the predictive quantity back to the value before the change. Also, in the case in which the discard ratio after the change decreases compared to the discard ratio before the change in the predictive quantity, the predictive quantity may be maintained, or the predictive quantity may be changed to further increase the difference from the predictive quantity before the change. Note that by limiting in advance the range over which to control the predictive quantity, the information processing apparatus 10 may also prevent the occurrence of a situation in which the predictive quantity increases excessively (and by extension, a situation in which speech recognition becomes excessively easy to launch), or a situation in which the predictive quantity decreases excessively (and by extension, a situation in which speech recognition becomes excessively difficult to launch).

In addition, the information processing apparatus 10 may also present information indicating the predictive quantity in a user-identifiable manner. For example, on the basis of the control result of the predictive quantity, the information processing apparatus 10 may present display information presenting the region V131 (or V133) illustrated in FIG. 15 to the user in an identifiable manner. With such a configuration, the user becomes able to visually recognize what kind of operation may be used to initiate various processes such as speech recognition. Also, even in the case in which the predictive quantity changes due to control by the information processing apparatus 10, the user becomes able to visually recognize the changed predictive quantity. Note that obviously the method of information notification and the medium for notification by the information processing apparatus 10 is not particularly limited.

Also, the trigger for controlling the predictive quantity is not necessarily limited to the examples indicated above. For example, the information processing apparatus 10 may also control the predictive quantity dynamically in accordance with a detection result of various states.

As a specific example, the information processing apparatus 10 may control the predictive quantity in accordance with the state during the period in which the preparation flag described earlier is set.

More specifically, in the case in which text is included in the result of the speech recognition process during the period in which the preparation flag is set (that is, in the case in which speech is recognized), a state in which the user is speaking is predicted. For this reason, in this case, the information processing apparatus 10 may control the predictive quantity so that the speech recognition process is launched more easily. For example, in the case of the example illustrated in FIG. 15, on the basis of the computation result of the distance d0, the information processing apparatus 10 may control the predictive quantity for predicting that the hand U11 will move to the position of the object V11 to be a larger value (for example, the longer distance d2 from among the distances d1 and d2). By such a control, compared to before the change of the predictive quantity, the speech recognition process is initiated less easily.

Also, in the case in which text is not included in the result of the speech recognition process during the period in which the preparation flag is set, a state in which the user is not speaking is predicted. For this reason, in this case, the information processing apparatus 10 may control the predictive quantity so that the speech recognition process is launched less easily. For example, in the case of the example illustrated in FIG. 15, on the basis of the computation result of the distance do, the information processing apparatus 10 may control the predictive quantity for predicting that the hand U11 will move to the position of the object V11 to be a smaller value (for example, the shorter distance d1 from among the distances d1 and d2). By such a control, compared to before the change of the predictive quantity, the speech recognition process is initiated less easily.

Figure 16:
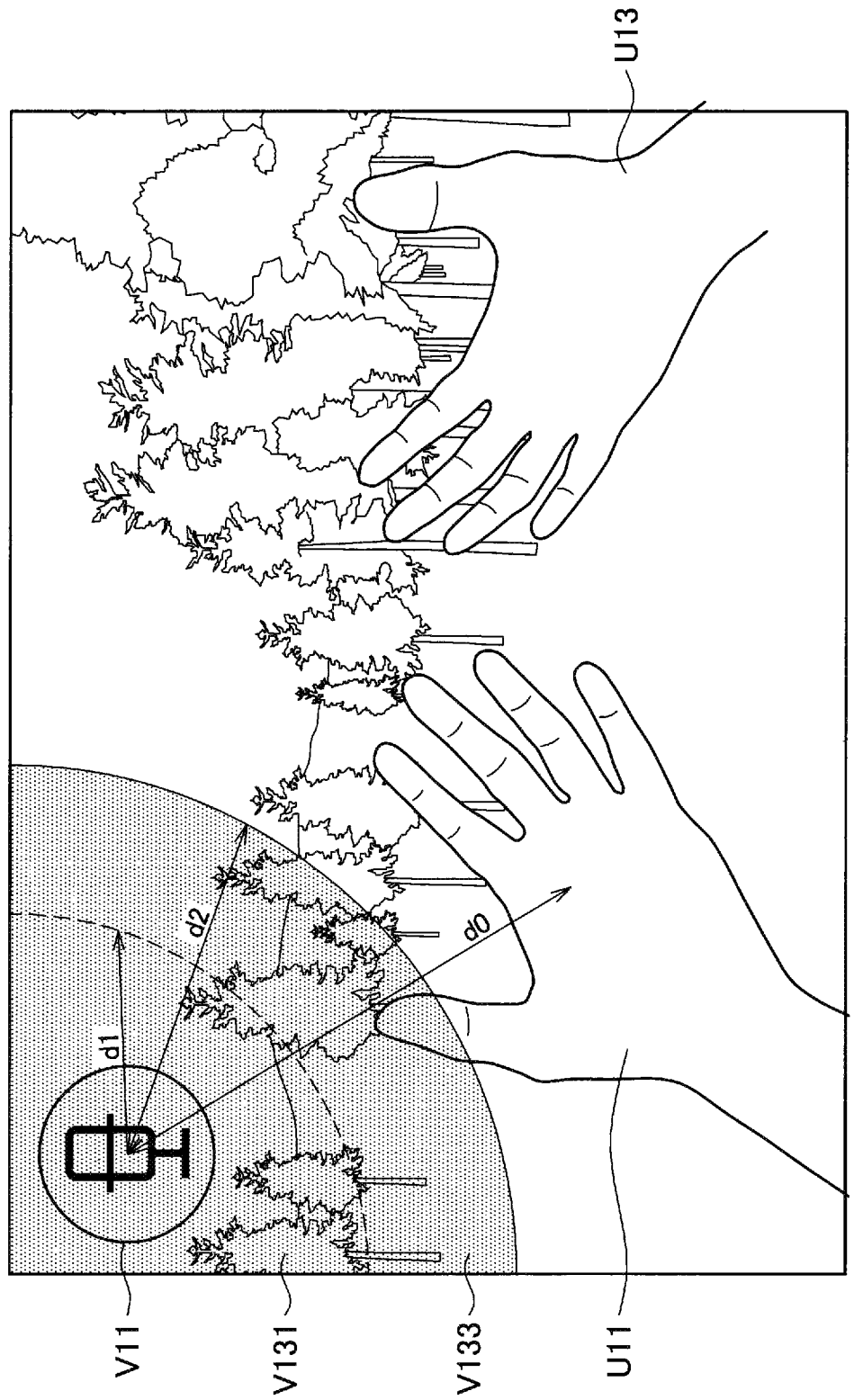
FIG. 16 is an explanatory diagram for explaining another example of operations of an information processing apparatus according to Modification 2 of the embodiment.

Also, as another example, the information processing apparatus 10 may also control the predictive quantity in accordance with a user operation state. For example, FIG. 16 is an explanatory diagram for explaining another example of operations of the information processing apparatus 10 according to Modification 2 of the present embodiment. FIG. 16 illustrates an example of a case in which the user operates each of a virtual left hand U11 and right hand U13 inside a virtual space by gesture input using each of one's own left and right hands, and thereby operates an object inside the virtual space. Note that in this description, like the example described with reference to FIG. 5, it is assumed that the user operates the virtual hand U11 (or the hand U13) inside a virtual space by gesture input, and by overlapping the hand U11 with an object V11, gives an instruction to initiate a speech recognition process. Also, similarly to the example illustrated in FIG. 15, it is predicted whether or not the hand U11 (or the hand U13) will move to the position of the object V11 (and by extension, whether or not an operation will be performed on the object V11 by the hand U11) in response to a subsequently input gesture, on the basis of a computation result of the distance do between the hand U11 and the object V11.

In the example illustrated in FIG. 16, the information processing apparatus 10 anticipates that an operation will be performed on the object V11 by the left hand U11 positioned closer to the object V11 from among the virtual left hand U11 and right hand U13, and treats the left hand U11 side as the target of action prediction. At this time, the information processing apparatus 10 may also control the predictive quantity in accordance with the state (for example, an action) of the right hand U13 which is different from the target of prediction.

More specifically, in the case in which the motion of the right hand U13 is large, a case of performing an operation of wildly moving one's hand (such as a game operation, for example) may be anticipated, and it is possible to estimate that there is a low probability that an operation related to initiating the speech recognition process (that is, an operation on the object V11) which is different from the operation will be performed. For this reason, for example, in the case in which at least one of the movement speed, the movement frequency, and the action range of the right hand U13 which is different from the target of prediction is a threshold value or greater, the information processing apparatus 10 may control the predictive quantity so that the speech recognition process is launched less easily. More specifically, on the basis of the computation result of the distance do, the information processing apparatus 10 may control the predictive quantity for predicting that the hand will move to the position of the object V11 to be a smaller value (for example, the shorter distance d1 from among the distances d1 and d2). By such a control, compared to before the change of the predictive quantity, the speech recognition process is initiated less easily.

Also, in the case in which the motion of the right hand U13 is small, a case in which another operation is not being performed particularly may be anticipated, and it is possible to estimate that, compared to the case in which the motion of the right hand U13 is large, there is a high probability that an operation related to initiating the speech recognition process (that is, an operation on the object V11) will be performed. For this reason, for example, in the case in which at least one of the movement speed, the movement frequency, and the action range of the right hand U13 which is different from the target of prediction is less than a threshold value, the information processing apparatus 10 may control the predictive quantity so that the speech recognition process is launched more easily. More specifically, on the basis of the computation result of the distance do, the information processing apparatus 10 may control the predictive quantity for predicting that the hand U11 will move to the position of the object V11 to be a larger value (for example, the longer distance d2 from among the distances d1 and d2). By such a control, compared to before the change of the predictive quantity, the speech recognition process is initiated more easily.

The above references FIGS. 15 and 16 to describe, as Modification 2 of the present embodiment, an example of control for optimizing operations related to the prediction of an operation based on gesture input.

<3. Hardware Configuration Example>

Figure 17:
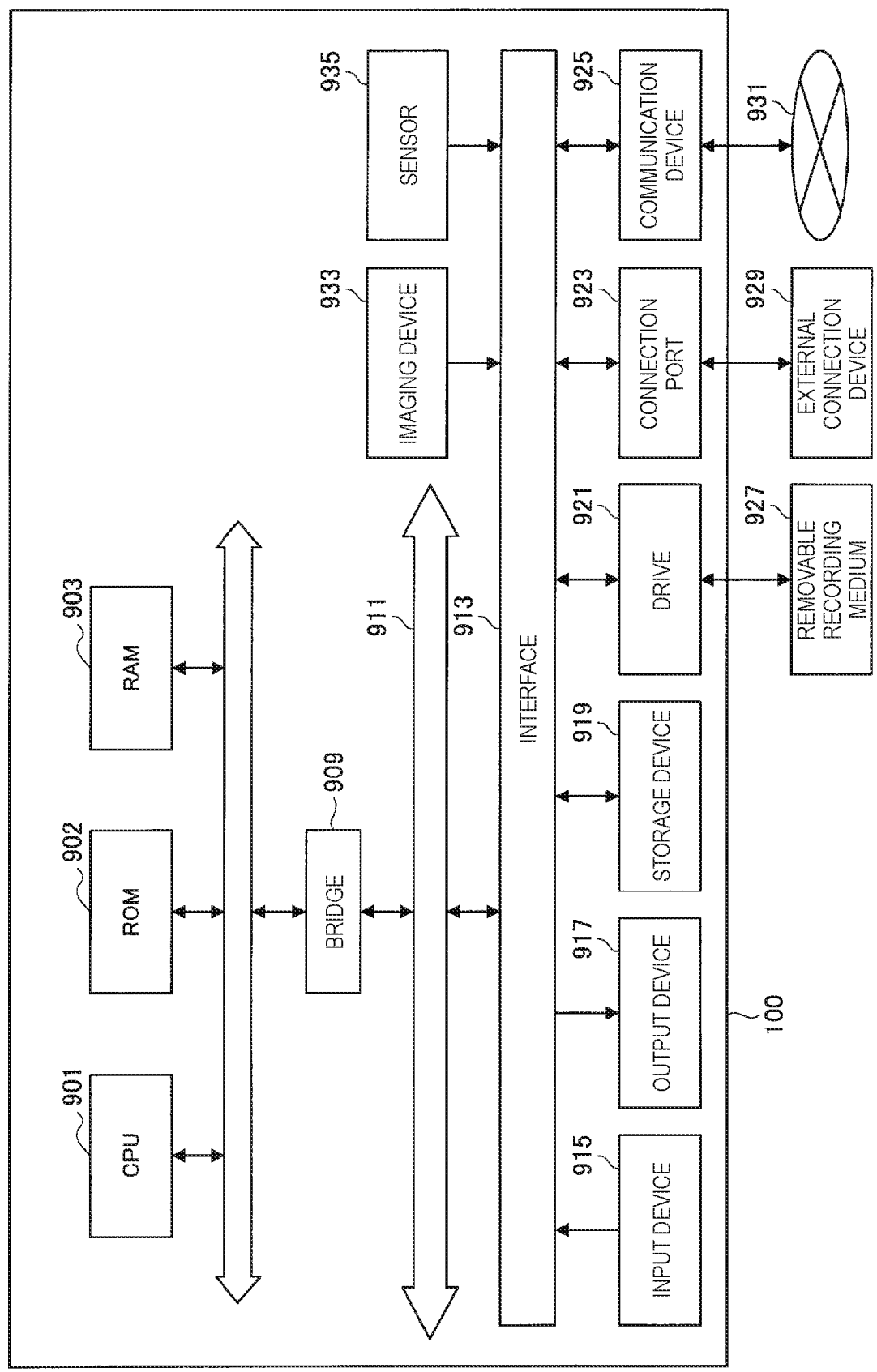
FIG. 17 is a block diagram illustrating an exemplary hardware configuration of the information processing apparatus according to the embodiment.

Next, a hardware configuration of the information processing apparatus 10 according to an embodiment of the present disclosure will be described with reference to FIG. 17. FIG. 17 is a block diagram illustrating a hardware configuration example of the information processing apparatus 10 according to an embodiment of the present disclosure.

As illustrated in FIG. 17, the information processing apparatus 10 includes a central processing unit (CPU) 901, a read only memory (ROM) 903, and a random access memory (RAM) 905. In addition, the information processing apparatus 10 may include a host bus 907, a bridge 909, an external bus 911, an interface 913, an input device 915, an output device 917, a storage device 919, a drive 921, a connection port 923, and a communication device 925. Further, the information processing apparatus 100 may include an imaging device 933 and a sensor 935 as necessary. The information processing apparatus 10 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing apparatus 10 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909. Note that, the above-described control unit 110 may be implemented by the CPU 901, for example.

The input device 915 is, for example, a device operated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the operation of the information processing apparatus 10. The input device 915 includes an input control circuit that generates an input signal on the basis of the information input by a user and outputs the input signal to the CPU 901. By operating the input device 915, a user can input various types of data to the information processing apparatus 10 or issue instructions for causing the information processing apparatus 10 to perform a processing operation. In addition, the imaging device 933 to be described below can function as an input device by imaging a motion or the like of a hand of the user. Note that, the above-described sound collection unit 203 may be implemented by the input device 915, for example.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing apparatus 10 in a form of video such as text or an image, and outputs voice or sound. In addition, the output device 917 may include a light or the like to brighten the surroundings. Note that, the above-described display unit 201 and sound output unit 202 may be implemented by the output device 917, for example.

The storage device 919 is a device for data storage configured as an example of a storage unit of the information processing apparatus 10. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside. Note that, the above-described storage unit 13 may be implemented by the storage device 919, for example.

The drive 921 is a reader/writer for the removable recording medium 927 such as a magnetic disk, an optical disk, a magneto-optical disk, or a semiconductor memory, and is embedded in the information processing apparatus 10 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing apparatus 10. The connection port 923 may be, for example, a universal serial bus (USB) port, an IEEE1394 port, a small computer system interface (SCSI) port, or the like. In addition, the connection port 923 may be an RS-232C port, an optical audio terminal. High-Definition Multimedia Interface (HDMI) (registered trademark) port, or the like. By connecting the external connection device 929 to the connection port 923, various data may be exchanged between the information processing apparatus 10 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images. Note that, the above-described imaging unit 207 may be implemented by the imaging device 933, for example.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 10, such as the attitude of the case of the information processing apparatus 10, as well as information regarding the environment surrounding the information processing apparatus 10, such as brightness or noise surrounding the information processing apparatus 10, for example. The sensor 935 may also include a global positioning system (GPS) sensor that receives GPS signals and measures the latitude, longitude, and altitude of the device. Note that the detection unit 205 described above may be realized by the sensor 935, for example.

The foregoing thus illustrates an exemplary hardware configuration of the information processing apparatus 10. Each of the above components may be realized with general-purpose members or hardware specialized in the function of each component. Such a configuration may also be modified as appropriate in accordance with the technological level at the time of the implementation.

Further, it is also possible to create a program for causing hardware such as a processor, a memory, and a storage incorporated into a computer to exert a function equivalent to the structural elements included in the above-described information processing apparatus 10. In addition, it is also possible to provide a computer readable storage medium in which the program is recorded.

<4. Conclusion>

As described above, in the information processing system 1 according to the present embodiment, the information processing apparatus 10 predicts an operation corresponding to a subsequently input gesture, on the basis of input information corresponding to a gesture detection result. Additionally, the information processing apparatus 10 controls a process related to the acquisition of other input information, such as speech or the like, on the basis of a prediction result of the operation. According to such a configuration, the information processing system 1 according to the present embodiment is able to, for example, initiate a process related to the acquisition of sound for speech recognition (and by extension, a speech recognition process) in advance, before the predicted operation is actually performed. For this reason, for example, the information processing system 1 is able to initiate the speech recognition process at an earlier timing compared to the case of initiating the process related to the acquisition of sound for speech recognition after an operation for initiating speech recognition is performed. In other words, according to the information processing system 1 according to the present embodiment, even under circumstances in which a gesture detection result is used to acquire other input information, such as speech or the like, it is possible to further mitigate the effect of a delay associated with recognizing the gesture, thereby enabling the acquisition of the other input information in a more favorable mode.

Note that in the example described above, a case in which an acquisition of speech is initiated together with a speech recognition process based on the speech is described as an example of a process related to speech recognition, but if the speech to be subjected to speech recognition can be acquired in advance, the timing at which the speech recognition process is executed is not necessarily limited. For example, the information processing system 1 may also initiate the recording (sound recording) of sound on the basis of a prediction result of an operation corresponding to a gesture, and after a series of sounds are stored, execute a speech recognition process based on the stored sounds after the fact.

Also, insofar as a process related to the acquisition of information and a process utilizing the information are controllable on the basis of a prediction result of an operation corresponding to a gesture, the type of information to be acquired is not particularly limited. As a specific example, the information processing system 1 may also control a process related to the acquisition of an image such as a still image or a moving image, and a recognition process utilizing the image (such as facial recognition, for example), on the basis of a prediction result of an operation corresponding to a gesture.

Also, in the example described above, the description focuses on gesture input utilizing a part such as the head or hand of the user. However, insofar as an action by a part of the user's body can be detected directly or indirectly, and the detection result can be utilized as input information, the target of application of the mechanism of the information processing system 1 according to the present embodiment described above is not necessarily limited to the example described above. As a specific example, the mechanism of the information processing system 1 according to the present embodiment is also applicable to a case in which a gesture known as swipe, pinch, or the like is performed by an operating body such as a finger or stylus on a touch panel. In this case, for example, the information processing apparatus 10 recognizes an action by an operating body such as a finger or stylus on the basis of a detection result of the operating body by the touch panel, and on the basis of the recognition result of the action, predicts an operation corresponding to a gesture to be input subsequently by the operating body. It is then sufficient for the information processing apparatus 10 to control a process related to the acquisition of input information such as speech or an image (and by extension, a recognition process based on the input information) in accordance with the prediction result of the action by the operating body.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
an acquisition unit that acquires, on a basis of first input information corresponding to a detection result of a gesture, a prediction result of an operation corresponding to the gesture that is input subsequently; and
a control unit that controls a process related to an acquisition of second input information associated with the first input information, in accordance with the prediction result of the operation.

(2)
The information processing apparatus according to (1), in which
the second input information is sound information, and
the control unit controls, in accordance with the prediction result of the operation, a process related to at least one of an acquisition of the sound information and a process based on the acquired sound information.

(3)
The information processing apparatus according to (2), in which
the control unit controls, in accordance with the prediction result of the operation, a process related to a recognition based on the sound information.

(4)
The information processing apparatus according to (3), in which
the control unit controls a process related to speech recognition based on speech spoken by a user as the process related to the recognition based on the sound information.

(5)
The information processing apparatus according to (4), in which
the control unit
sets a flag in a case in which the prediction result of the operation satisfies a first condition, and cancels the set flag in a case in which the prediction result of the operation satisfies a second condition, and
controls the process related to speech recognition accordance with a set state of the flag.

(6)
The information processing apparatus according to (5), in which the control unit controls a process related to machine learning corresponding to the result of the speech recognition, in accordance with the set state of the flag.

(7)
The information processing apparatus according to any one of (1) to (6), which
the control unit controls, in accordance with the prediction result of the operation, an initiation timing of the process related to the acquisition of the second input information.

(8)
The information processing apparatus according to any one of (1) to (7), in which
the control unit causes a predetermined notification unit to issue a notification of information corresponding to a state of the process related to the acquisition of the second input information.

(9)
The information processing apparatus according to any one of (1) to (8), in which
the control unit determines whether or not the prediction result of the operation satisfies a predetermined condition, and on a basis of the determination result, controls a process related to the acquisition of the second input information.

(10)

The information processing apparatus according to (9), in which the control unit controls a threshold value for determining whether or not the prediction result of the operation satisfies a third condition that is the predetermined condition, on a basis on a fourth condition.

(11)

The information processing apparatus according to (10), in which the control unit controls the threshold value on a basis of a past execution result of the process related to the acquisition of the second input information as the fourth condition.

(12)

The information processing apparatus according to (10), in which the control unit controls the threshold value on a basis of a result of a speech recognition process on sound information acquired as the second input information during a predetermined period as the fourth condition.

(13)

The information processing apparatus according to (10), in which the control unit controls the threshold value on a basis of a detection result of motion of another operating body different from an operating body subject to detection of a gesture as the fourth condition.

(14)

The information processing apparatus according to any one of (10) to (13), in which the control unit causes a predetermined notification unit to issue a notification of information indicating the threshold value.

(15)

The information processing apparatus according to any one of (9) to (14), in which the control unit executes the process related to the acquisition of the second input information in a case of determining that the prediction result of the operation satisfies the predetermined condition, and ends the process being executed in a case of determining that the prediction result of the operation does not satisfy the predetermined condition.

(16)

The information processing apparatus according to any one of (1) to (15), in which the first input information is information based on a recognition result of a predetermined part of a user.

(17)

The information processing apparatus according to (16), in which the acquisition unit acquires the prediction result of the operation based on a recognition result of at least one of a shape, an action, a position, and a facing of the part corresponding to the first input information.

(18)

The information processing apparatus according to any one of (1) to (15), in which the acquisition unit acquires the prediction result of the operation corresponding to a mode of a display object based on the first input information.

(19)

The information processing apparatus according to (18), in which the acquisition unit acquires the prediction result of the operation corresponding to at least one of a motion and a shape of the display object that are the mode of the display object.

(20)

The information processing apparatus according to (18) or (19), in which the control unit controls an operation related to the acquisition of the second input information in accordance with an estimation result of a position to which the display object moves, the position being based on the prediction result of the operation.

(21)

The information processing apparatus according to (20), in which the control unit controls operations related to the acquisition of the second input information in accordance with a positional relationship between the position where the display object is estimated to move on the basis of the prediction result of the operation, and a predetermined region.

(22)

The information processing apparatus according to (20), in which the control unit controls operations related to the acquisition of the second input information in accordance with a positional relationship between the position where a first display object is estimated to move on the basis of the prediction result of the operation, and a second display object different from the first display object.

(23)

An information processing method including, by a processor:

acquiring, on a basis of first input information corresponding to a detection result of a gesture, a prediction result of an operation corresponding to the gesture that is input subsequently; and controlling a process related to an acquisition of second input information associated with the first input information, in accordance with the prediction result of the operation.

(24)

A program causing a computer to execute:

acquiring, on a basis of first input information corresponding to a detection result of a gesture, a prediction result of an operation corresponding to the gesture that is input subsequently; and controlling a process related to an acquisition of second input information associated with the first input information, in accordance with the prediction result of the operation.

REFERENCE SIGNS LIST 1 information processing system
10 information processing apparatus
101 output control unit
103 sound processing unit
105 gesture recognition processing unit
110 control unit
111 content control unit
113 prediction unit
115 timing control unit
13 storage unit
20 input/output apparatus
201 display unit
202 sound output unit
203 sound collection unit 205 detection unit
207 imaging unit
30 content control apparatus
40 sound processing apparatus

The invention claimed is:

1. An information processing apparatus comprising:
an acquisition unit that acquires, on a basis of first input information corresponding to a detection result of a gesture, a prediction result of an operation corresponding to the gesture that is input subsequently; and
a control unit that
determines whether or not the prediction result of the operation satisfies a predetermined condition, and on a basis of the determination result, controls a process related to at least one of an acquisition of a second input information or a process based on the acquired second input information, and
executes the process related to the acquisition of the second input information or the process based on the acquired second input information prior to completion of the gesture that is input subsequently in a case of determining that the prediction result of the operation satisfies the predetermined condition, and ends the process being executed in a case of determining that the prediction result of the operation does not satisfy the predetermined condition,
wherein the second input information is sound information, and
wherein the acquisition unit and the control unit are each implemented via at least one processor.

2. The information processing apparatus according to claim 1, wherein
the control unit controls, in accordance with the prediction result of the operation, a process related to an acquisition of the sound information.

3. The information processing apparatus according to claim 1, wherein
the control unit controls, in accordance with the prediction result of the operation, a process related to a recognition based on the sound information.

4. The information processing apparatus according to claim 3, wherein
the control unit controls a process related to speech recognition based on speech spoken by a user as the process related to the recognition based on the sound information.

5. The information processing apparatus according to claim 4, wherein
the control unit
sets a flag in a case in which the prediction result of the operation satisfies a first condition, and cancels the set flag in a case in which the prediction result of the operation satisfies a second condition, and
controls the process related to speech recognition in accordance with a set state of the flag.

6. The information processing apparatus according to claim 1, wherein
the control unit controls, in accordance with the prediction result of the operation, an initiation timing of the process related to the acquisition of the second input information.

7. The information processing apparatus according to claim 1, wherein
the control unit causes a predetermined notification unit to issue a notification of information corresponding to a state of the process related to the acquisition of the second input information.

8. The information processing apparatus according to claim 1, wherein
the control unit controls a threshold value for determining whether or not the prediction result of the operation satisfies a third condition that is the predetermined condition, on a basis on a fourth condition.

9. The information processing apparatus according to claim 8, wherein
the control unit controls the threshold value on a basis of a past execution result of the process related to the acquisition of the second input information as the fourth condition.

10. The information processing apparatus according to claim 8, wherein
the control unit controls the threshold value on a basis of a result of a speech recognition process on sound information acquired as the second input information during a predetermined period as the fourth condition.

11. The information processing apparatus according to claim 8, wherein
the control unit controls the threshold value on a basis of a detection result of motion of another operating body different from an operating body subject to detection of a gesture as the fourth condition.

12. The information processing apparatus according to claim 1, wherein
the first input information is information based on a recognition result of a predetermined part of a user.

13. The information processing apparatus according to claim 12, wherein
the acquisition unit acquires the prediction result of the operation based on a recognition result of at least one of a shape, an action, a position, and a facing of the part corresponding to the first input information.

14. The information processing apparatus according to claim 1, wherein
the acquisition unit acquires the prediction result of the operation corresponding to a mode of a display object based on the first input information.

15. The information processing apparatus according to claim 14, wherein
the acquisition unit acquires the prediction result of the operation corresponding to at least one of a motion and a shape of the display object that are the mode of the display object.

16. The information processing apparatus according to claim 14, wherein
the control unit controls an operation related to the acquisition of the second input information in accordance with an estimation result of a position to which the display object moves, the position being based on the prediction result of the operation.

17. An information processing method executed by at least one processor, the method comprising:
acquiring, on a basis of first input information corresponding to a detection result of a gesture, a prediction result of an operation corresponding to the gesture that is input subsequently;
determining whether or not the prediction result of the operation satisfies a predetermined condition, and on a basis of the determination result, controlling a process related to at least one of an acquisition of a second input information or a process based on the acquired second input information; and
executing the process related to the acquisition of the second input information or the process based on the acquired second input information prior to completion of the gesture that is input subsequently in a case of determining that the prediction result of the operation satisfies the predetermined condition, and ending the process being executed in a case of determining that the prediction result of the operation does not satisfy the predetermined condition, wherein the second input information is sound information.

18. A non-transitory computer-readable medium having embodied thereon a program, which when executed by a computer causes the computer to execute an information processing method, the information processing method comprising:

acquiring, on a basis of first input information corresponding to a detection result of a gesture, a prediction result of an operation corresponding to the gesture that is input subsequently;

determining whether or not the prediction result of the operation satisfies a predetermined condition, and on a basis of the determination result, controlling a process related to at least one of an acquisition of a second input information or a process based on the acquired second input information; and executing the process related to the acquisition of the second input information or the process based on the acquired second input information prior to completion of the gesture that is input subsequently in a case of determining that the prediction result of the operation satisfies the predetermined condition, and ending the process being executed in a case of determining that the prediction result of the operation does not satisfy the predetermined condition, wherein the second input information is sound information.

* * * * *